(12) United States Patent
Kamiya et al.

(10) Patent No.: US 12,311,556 B2
(45) Date of Patent: May 27, 2025

(54) CONTROL SYSTEM, PRODUCTION METHOD, AND PROGRAM

(71) Applicant: KABUSHIKI KAISHA YASKAWA DENKI, Kitakyushu (JP)

(72) Inventors: Yosuke Kamiya, Kitakyushu (JP); Shinichiro Obata, Kitakyushu (JP); Aya Matsunaga, Kitakyushu (JP); Megumi Yasuda, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 184 days.

(21) Appl. No.: 18/168,051

(22) Filed: Feb. 13, 2023

(65) Prior Publication Data
US 2023/0256603 A1  Aug. 17, 2023

(30) Foreign Application Priority Data
Feb. 15, 2022  (JP) ................. 2022-021451

(51) Int. Cl.
*B25J 9/16* (2006.01)
*G05B 19/042* (2006.01)
*G05B 19/4069* (2006.01)

(52) U.S. Cl.
CPC .......... *B25J 9/1671* (2013.01); *B25J 9/1679* (2013.01); *G05B 19/4069* (2013.01)

(58) Field of Classification Search
CPC .................. B25J 9/1671; B25J 9/1679; G05B 2219/4069
See application file for complete search history.

(56) References Cited

U.S. PATENT DOCUMENTS

| | | |
|---|---|---|
| 2002/0009354 A1 | 1/2002 | Nagaya et al. |
| 2006/0276934 A1 | 12/2006 | Nihei et al. |
| 2010/0153073 A1 | 6/2010 | Nagatsuka et al. |
| 2021/0178589 A1* | 6/2021 | Yamashita .............. B25J 9/162 |
| 2023/0107431 A1* | 4/2023 | Hashiguchi ........... B25J 9/1671 |
| | | 700/246 |

FOREIGN PATENT DOCUMENTS

| | | |
|---|---|---|
| EP | 1 731 273 A2 | 12/2006 |
| EP | 3 838 506 A1 | 6/2021 |
| EP | 4 144 490 A1 | 3/2023 |

(Continued)

OTHER PUBLICATIONS

Japanese Office Action issued Oct. 3, 2023 in Japanese Application No. 2022-021451, with English translation, citing document 15, therein, 11 pgs.

(Continued)

*Primary Examiner* — Dale Moyer
(74) *Attorney, Agent, or Firm* — Oblon, McClelland, Maier & Neustadt, L.L.P.

(57) ABSTRACT

A control system includes multiple devices each of which independently executes one or more of multiple processes with respect to multiple objects, a memory that stores a setting specified by a user about an execution condition of one or more of the multiple processes, and processing that acquires a current status of the control system, dynamically determines a process to be executed next among the multiple processes based on the setting and the status, and controls the devices.

20 Claims, 18 Drawing Sheets

(56) References Cited

FOREIGN PATENT DOCUMENTS

| | | |
|---|---|---|
| JP | 2000-313517 A | 11/2000 |
| JP | 2001-347428 A | 12/2001 |
| JP | 2010-140359 A | 6/2010 |
| JP | 2012-194678 A | 10/2012 |
| WO | WO 2021/251389 A1 | 12/2021 |

OTHER PUBLICATIONS

Japanese Office Action issued Jan. 23, 2024 in Japanese Patent Application No. 2022-021451 (with English Translation), 9 pages.
European Office Action issued Nov. 28, 2023 in European Patent Application No. 23 155 810.7, 5 pages.
Extended European Search Report issued Jun. 28, 2023, in corresponding European Patent Application No. 23155810.7, 8 pages.
European Office Action issued Nov. 25, 2024, in corresponding European Patent Application No. 23 155 810.7, 5 pages.

\* cited by examiner

FIG. 3
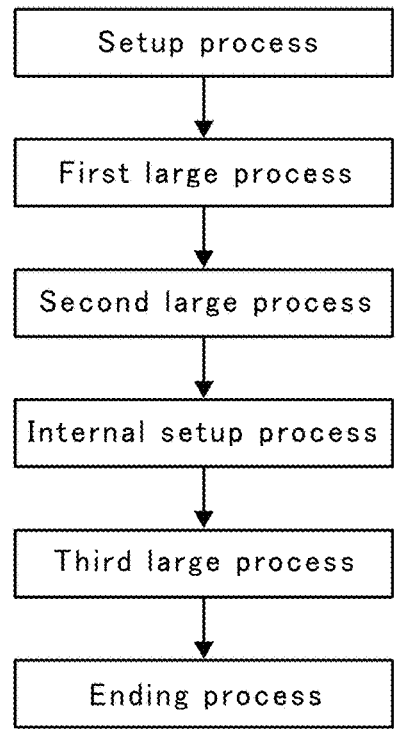
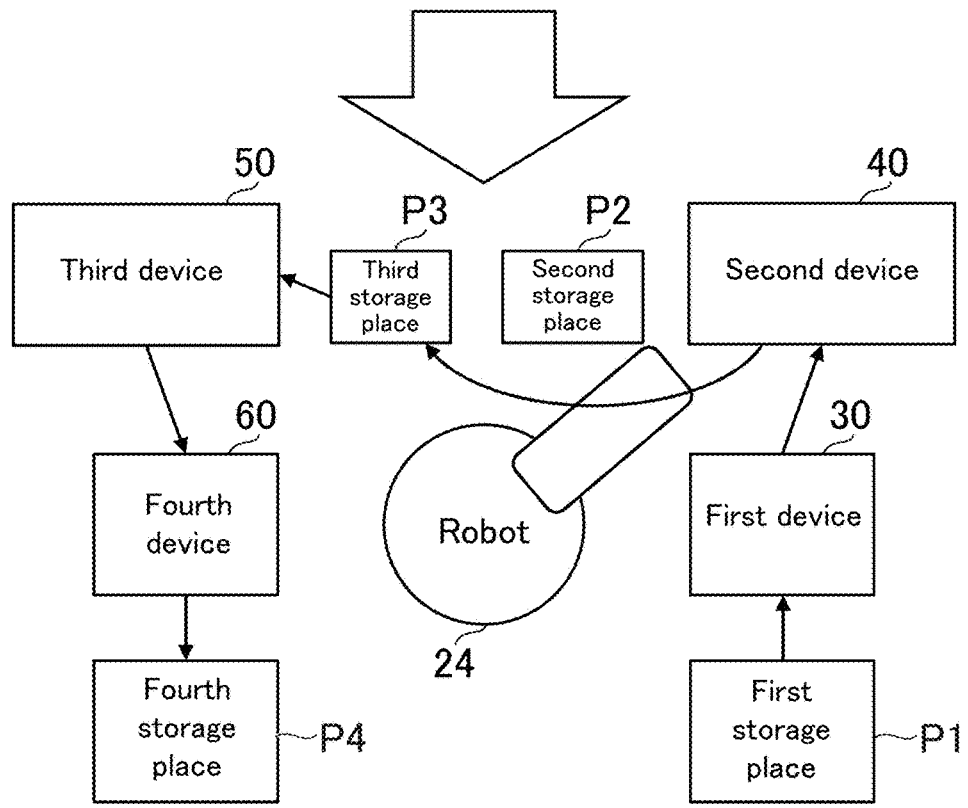

FIG. 6

| Execution order | Process name | Initial flag | Cycle information | Ending flag | Time information | Number-of-units information | Priority information | Execution condition |
|---|---|---|---|---|---|---|---|---|
| 1 | Setup process | ✓ | | | 10 | | | Condition1 |
| 2 | First large process | | | | 70 | 20 | | Condition2 |
| 3 | Second large process | | | | 1800 | | 2 | Condition3 |
| 4 | Internal setup process | | | | 25 | 6 | | Condition4 |
| 5 | Third large process | | | | 3600 | | 1 | Condition5 |
| 6 | Ending process | | | ✓ | 35 | 20 | | Condition6 |

| Status variable | | | Arrangement number variable | Object variable 1 | Object variable 2 | ... | Object variable n |
|---|---|---|---|---|---|---|---|
| Setup process | First large process | ... | Ending process | | | | |
| 1 | 2 | ... | 1 | 3 | 5 | 5 | ... | 0 |

Setting screen G1

Please enter process settings.

| Execution order | Process name | Initial flag | Cycle information | Ending flag | Time information | Number-of-units information | Priority information | Execution condition |
|---|---|---|---|---|---|---|---|---|
| 1 | Setup process | ✓ | | | 10 | | | Condition 1 |
| 2 | First large process | | | | 70 | 20 | | Condition 2 |
| 3 | Second large process | | | | 1800 | | 2 | Condition 3 |
| 4 | Internal setup process | | | | 25 | 6 | | Condition 4 |
| 5 | Third large process | | | | 3600 | | 1 | Condition 5 |
| 6 | Ending process | | | ✓ | 35 | 20 | | Condition 6 |

Simulate  B10

After that, animation until the end of the simulation

FIG. 18
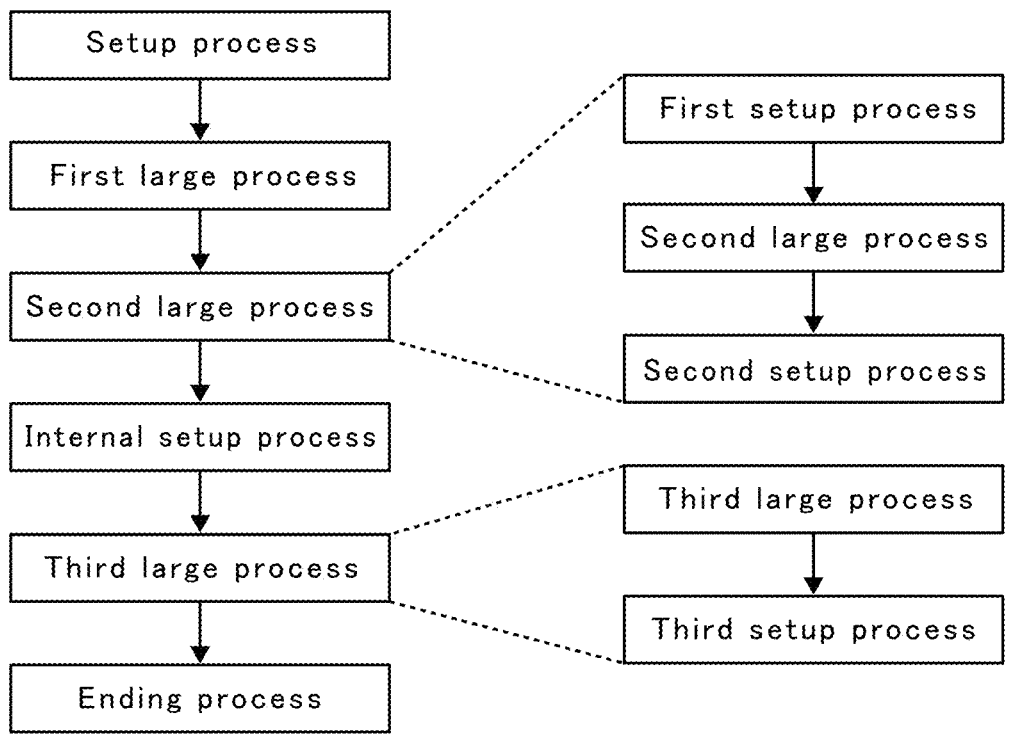
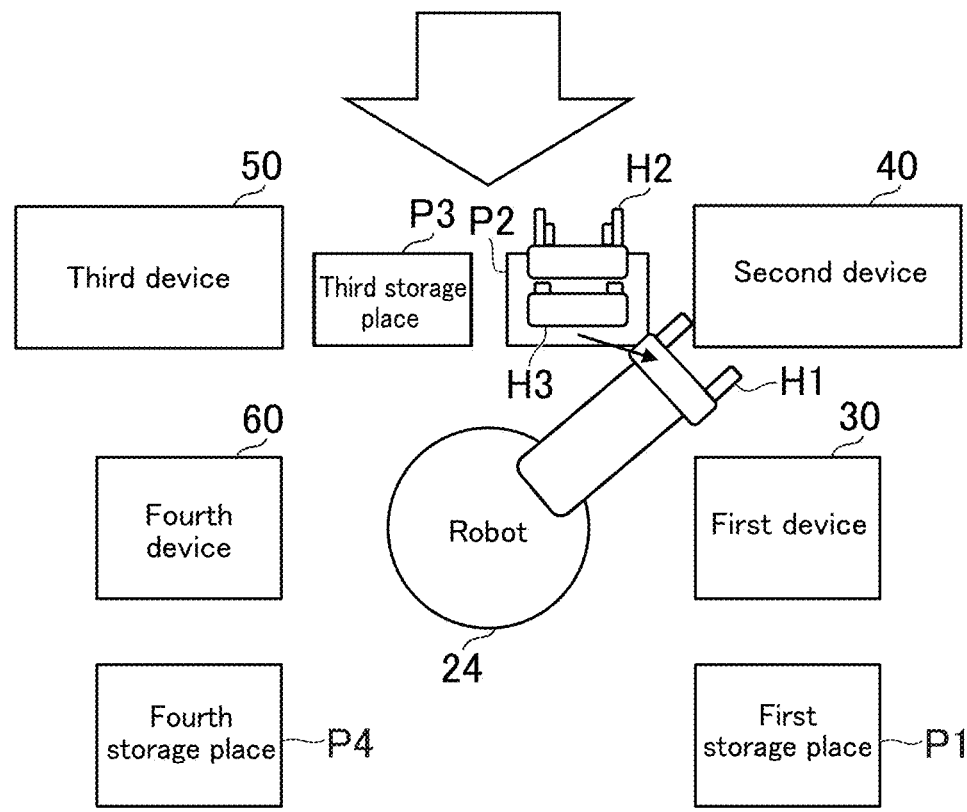

CONTROL SYSTEM, PRODUCTION METHOD, AND PROGRAM

CROSS-REFERENCE TO RELATED APPLICATIONS

The present application is based upon and claims the benefit of priority to Japanese Patent Application No. 2022-021451, filed Feb. 15, 2022, the entire contents of which are incorporated herein by reference.

BACKGROUND OF THE INVENTION

Field of the Invention

The present invention relates to a control system, a production method, and a program.

Description of Background Art

Japanese Patent Application Laid-Open Publication No. 2012-194678 describes a technology in which a program is created by describing an operation of a PLC (Programmable Logic Controller). The entire contents of this publication are incorporated herein by reference.

SUMMARY OF THE INVENTION

According to one aspect of the present invention, a control system includes multiple devices each of which independently executes one or more of multiple processes with respect to multiple objects, a memory that stores a setting specified by a user about an execution condition of one or more of the multiple processes, and processing that acquires a current status of the control system, dynamically determines a process to be executed next among the multiple processes based on the setting and the status, and controls the devices.

According to another aspect of the present invention, a method for a control system including multiple devices each of which independently executes one or more of multiple processes with respect to multiple objects includes storing a setting specified by a user about an execution condition of one or more of the multiple processes, acquiring a current status of the control system, dynamically determining a process to be executed next among the multiple processes based on the setting and the status, and controlling the devices.

According to yet another aspect of the present invention, a non-transitory computer-readable storage medium includes computer executable instructions. When executed by a control system, the computer executable instructions control multiple devices each of which independently executes one or more of multiple processes with respect to multiple objects and cause the control system to perform a method including storing a setting specified by a user about an execution condition of one or more of the multiple processes, acquiring a current status of the control system, dynamically determining a process to be executed next among the multiple processes based on the setting and the status, and controlling the devices.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 illustrates an example of processes executed with respect to an individual object according to an embodiment of the present invention;

FIG. 6 illustrates a data storage example of setting data according to an embodiment of the present invention;

FIG. 7 illustrates a data storage example of status data according to an embodiment of the present invention;

FIG. 8 illustrates an example of a setting screen according to an embodiment of the present invention;

FIG. 18 illustrates an example of a process to be executed when hand replacement is considered according to an embodiment of the present invention.

DETAILED DESCRIPTION OF THE EMBODIMENTS

Figure 1:
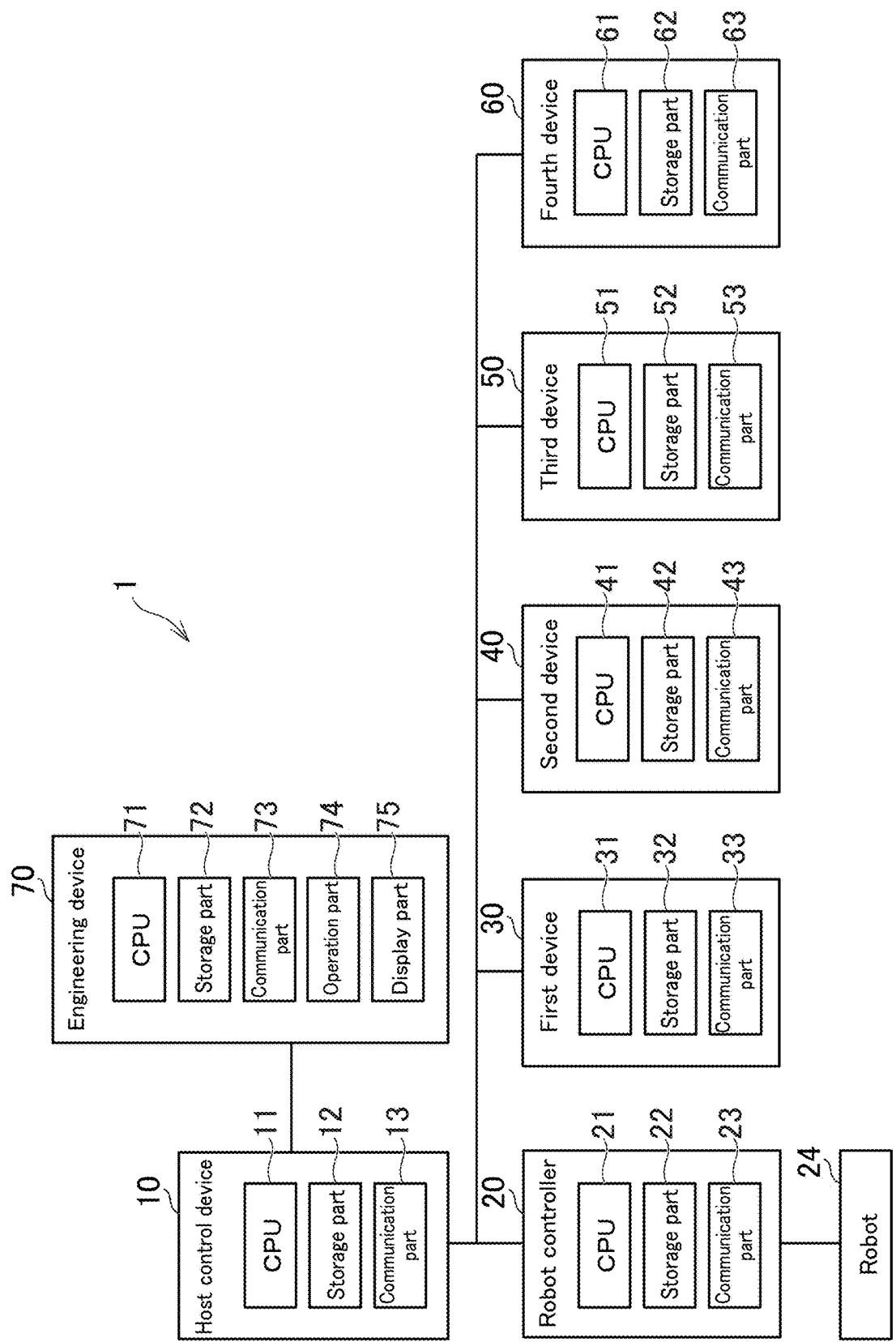
FIG. 1 illustrates an example of an overall structure of a control system according to an embodiment of the present invention.

Embodiments will now be described with reference to the accompanying drawings, wherein like reference numerals designate corresponding or identical elements throughout the various drawings.

First Embodiment

A control system and the like according to a first embodiment are described in detail.

Overall Structure of Control System

FIG. 1 illustrates an example of an overall structure of the control system. As illustrated in FIG. 1, a control system 1 of the first embodiment includes a host control device 10, a robot controller 20, a first device 30, a second device 40, a third device 50, a fourth device 60, and an engineering device 70, and these devices are communicatively connected. In the first embodiment, a case is described where the devices are connected by a general network such as an Ethernet (registered trademark). However, the devices can be connected by any network. For example, the devices may be connected by an industrial network (including a so-called field network).

The host control device 10 is a device that controls the entire control system 1. When the entire control system 1 is referred to as a cell, which is a unit smaller than a line, the host control device 10 may be referred to as a cell controller. A CPU 11 includes at least one processor. The CPU 11 is a type of circuitry. A storage part 12 includes at least one of a volatile memory such as RAM and a non-volatile memory such as a flash memory. The storage part 12 stores a program and data. A communication part 13 includes at least one of a communication interface for wired communication and a communication interface for wireless communication.

The robot controller 20 is a device that controls a robot 24. Physical structures of a CPU 21, a storage part 22, and a communication part 23 may be respectively the same as those of the CPU 11, the storage part 12, and the communication part 13. For example, the robot 24 includes an arm, a hand, a motor, and a sensor. The robot 24 is connected to the robot controller 20 by power lines and communication lines.

The first device 30, the second device 40, the third device 50, and the fourth device 60 are devices controlled by the host control device 10. For example, the first device 30, the second device 40, the third device 50, and the fourth device 60 are each a motor control device, a motion controller, a robot controller, a processing device, a measuring device, or an inspection device. Physical structures of CPUs (31, 41, 51, 61), storage parts (32, 42, 52, 62), and communication parts (33, 43, 53, 63) may be respectively the same as those of the CPU 11, the storage part 12, and the communication part 13.

The engineering device 70 is a device operated by a user. For example, the engineering device 70 is a personal computer, a smart phone, or a tablet terminal. Physical structures of a CPU 71, a storage part 72, and a communication part 73 may be respectively the same as those of the CPU 11, the storage part 12, and the communication part 13. An operation part 74 is an input device such as a mouse or a keyboard. A display part 75 is a liquid crystal display or an organic EL display.

The programs and data described as being stored in the storage parts (12, 22, 32, 42, 52, 62, 72) may be supplied via a network. Further, a hardware structure of each of the devices may include a reading part (for example, an optical disk drive or a memory card slot) that reads a computer-readable information storage medium, or an input-output part (for example, a USB terminal) for directly connecting to an external device may be included. In this case, a program stored in the information storage medium may be supplied via the reading part or the input-output part. In addition, for example, a circuit referred to as an FPGA or an ASIC may be included. An FPGA or an ASIC may correspond to a circuitry.

Overview of Control System

The control system 1 includes multiple devices that each independently execute at least one of multiple processes with respect to multiple objects with respect to each of which the multiple processes are to be executed. In the first embodiment, the robot controller 20, the robot 24, the first device 30, the second device 40, the third device 50, and the fourth device 60 are examples of the multiple devices. In the first embodiment, a case is described where these six devices are included in the control system 1. However, the number of devices included in the control system 1 may be any number, for example, may be 2-5 or 7 or more.

A process is a work with respect to an object. A process can be a physical operation of an individual device. A process itself may be of any type, for example, may be a moving process, a processing process, a measurement process, a cleaning process, a carrying process, or an inspection process. In the first embodiment, the robot controller 20 and the robot 24 executes a moving process. The first device 30 executes a measurement process. The second device 40 and the third device 50 each execute a processing process. The fourth device executes a cleaning process.

An object is an object of a process. An object is also referred to as a workpiece. An object may be any of a final product, an intermediate product, a material, or a raw material. An object itself may be of any type, for example, may be a semiconductor, an electrical appliance, an automobile, a food, a beverage, a pharmaceutical, or a daily necessity. In the first embodiment, an order of multiple processes with respect to one object is predetermined.

In the control system 1, multiple processes are concurrently executed. For example, rather than starting a first process with respect to an object (B) after all processes with respect to an object (A) are completed, a process (X) with respect to the object (A) and a process (Y) with respect to the object (B) are concurrently executed. The number of processes concurrently executed is not limited to two, but may be three or more. It is not always necessary to concurrently execute multiple processes, and there may be a state in which only one process is executed, or a state in which none of the processes are executed. It is sufficient when there is a period during which multiple processes are concurrently executed during operation of the control system 1.

Figure 2:
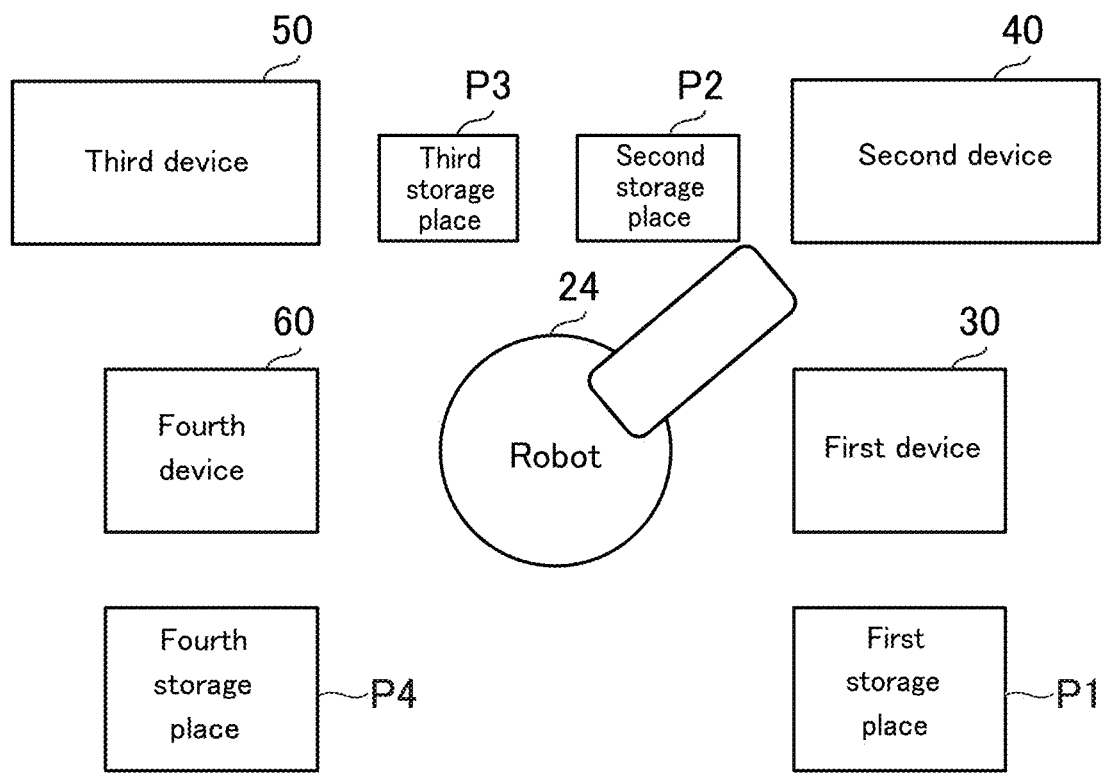
FIG. 2 illustrates an example of a positioning of devices in a control system according to an embodiment of the present invention.

FIG. 2 illustrates an example of an arrangement of the devices in the control system 1. In FIG. 2, the host control device 10, the robot controller 20, and the engineering device 70 are omitted. For example, in a counterclockwise order around the robot 24, a first storage place (P1), the first device 30, the second device 40, a second storage place (P2), a third storage place (P3), the third device 50, the fourth device 60, and a fourth storage place (P4) are arranged. The arrangement of the devices may be any arrangement and is not limited to the example of FIG. 2.

The first storage place (P1)—the fourth storage place (P4) are each a place to put something. For example, an object before the first process is executed is arranged in the first storage place (P1). One or more hands that can be attached to the robot 24 are arranged in the second storage place (P2). An object for which a processing process has been completed is arranged in the third storage place (P3). The third storage place (P3) can also be place where an object waiting for a next processing process is arranged. An object for which all the processes have been completed is arranged in the fourth storage place (P4).

In the first embodiment, the first storage place (P1), the third storage place (P3), and the fourth storage place (P4) each have a limited space where an object can be arranged. For example, up to 20 objects can be arranged in each of the first storage place (P1) and the fourth storage place (P4). For example, up to 6 objects can be arranged in the third storage place (P3). The number of objects that can be arranged in each of the first storage place (P1), the third storage place (P3), and the fourth storage place (P4) is not limited to the example of the first embodiment, and may be any number.

FIG. 3 illustrates an example of processes executed with respect to an individual object. In the first embodiment, a case is described where a two-step processing process is executed with respect to an object. The second device 40 processes a right half of an object as a first processing process. The third device 50 processes a left half of the object as a second processing process. The processes of FIG. 3 are executed with respect to an individual object moving counterclockwise around the robot 24.

A setup process is a process corresponding to preparing for the other processes. For example, the setup process includes a loading process in which an object is loaded to the first storage place (P1). The loading process may be executed by the robot 24, or may be executed by a peripheral device such as a carrying robot. The setup process may include other processes such as a mounting process in which a hand arranged in the second storage space (P2) is attached to the robot 24.

A first large process-a third large process are each a process that requires a relatively long time. For example, the first large process includes a moving process in which the robot 24 moves an object from the first storage place (P1) to the first device 30, and a measurement process in which the first device 30 performs measurement with respect to the object. The second large process includes a moving process in which the robot 24 moves an object from the first device 30 to the second device 40, and a processing process in which the second device 40 processes a right half of the object.

An internal setup process is executed between the second large process and the third large process. The internal setup process is a process in which, in principle, internal setup is executed by stopping at least one of the devices. For example, attaching a hand to the robot 24, exchanging a peripheral jig, or supplying a part corresponds to the internal setup process. The internal setup process of the first embodiment also includes a moving process in which the robot 24 moves an object from the second device 40 to the third storage place (P3). It is also possible that this moving process is included in the third large process.

For example, the third large process includes a moving process in which the robot 24 moves an object from the third storage place (P3) to the third device 50, and a processing process in which the third device 50 processes a left half of the object. An ending process includes a moving process in which the robot 24 moves an object from the third device 50 to the fourth device 60, a cleaning process in which the fourth device 60 cleans the object, and a moving process in which the robot 24 moves the object from the fourth device 60 to the fourth storage place (P4). The ending process may also include a carrying-out process in which a peripheral device such as a carrying robot carries out an object from the fourth storage place (P4).

In the control system 1 in which multiple processes are concurrently executed, as a task arbitration, a definition such as "when Source is Complete and Destination is Ready, a task is executed" can be considered. Source is a process before a process corresponding to a task, and Destination is a process after the process corresponding to the task. That is, it is considered that, as a task arbitration, that execution of a pre-process has been completed and a post-process is ready can be set as a condition for executing a certain process.

However, a task arbitration as described above may cause various problems. Examples of such problems include: (Problem 1) a destination of an object is filled; (Problem 2) a process cannot be prioritized; (Problem 3) an end time of a process is not considered; and (Problem 4) multiple processes cannot be executed at the same time. When these problems occur, operation efficiency of the control system 1 decreases. In the first embodiment, a structure that solves Problem 1 is described, and structures that solve Problems 2-4 are described in other embodiments and modified embodiments.

Figure 4:
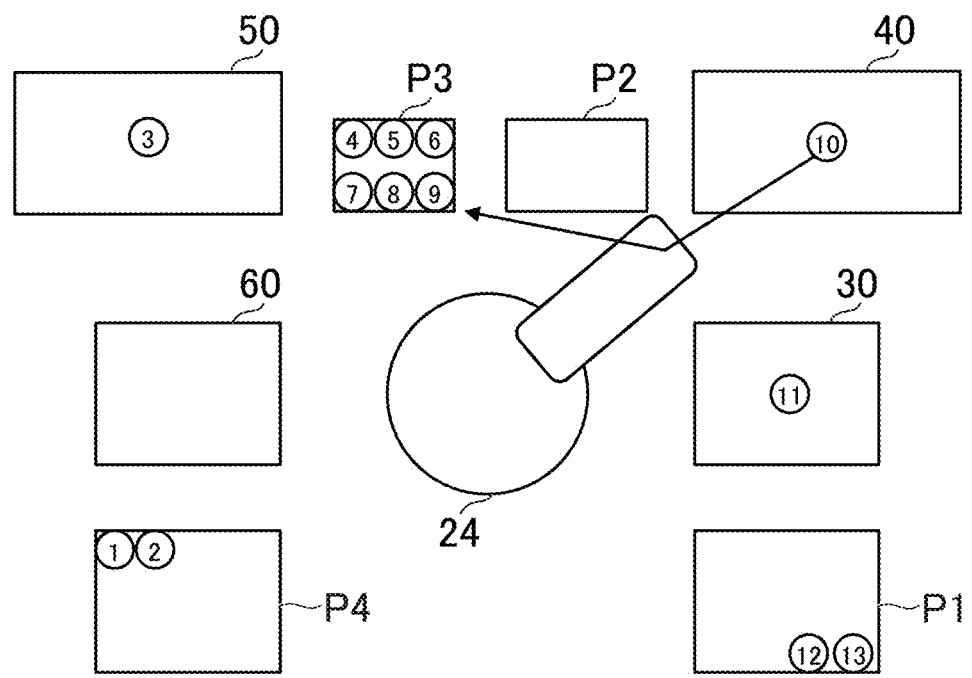
FIG. 4 is an explanatory diagram of Problem 1 (a destination of an object is filled)

FIG. 4 is an explanatory diagram of Problem 1 (a destination of an object is filled). In the example of FIG. 4, there are thirteen objects and each object is indicated by a circle. The numbers in the circles indicate the order in which the objects are taken out from the first storage place (P1). The thirteen objects carried into the first storage place (P1) are taken out one by one from the first storage place (P1), and the processes are executed one after another.

In general, a time required for a processing process is much longer than a time required for other processes. When a processing process of the third device 50 requires a very long time, objects are likely to accumulate in the third storage place (P3). For example, when a maximum number of objects that can be arranged in the third storage place (P3) is six, in the state of FIG. 4, no more objects can be arranged in the third storage place (P3). In the state of FIG. 4, when the tenth object is taken out from the second device 40, there is a possibility that the tenth object may come into contact with the fourth-ninth objects arranged in the third storage place (P3). In this case, the control system 1 detects an error and stops operating, resulting in a decrease in operation efficiency.

Therefore, the host control device 10 counts the number of objects arranged in the third storage place (P3) and determines whether or not to execute a moving process from the second device 40 to the third storage place (P3). The host control device 10 solves Problem 1 (a destination of an object is filled) by executing the moving process on a condition that the number of counted objects is less than 6 (5 or less). In the following, details of the control system 1 of the first embodiment are described.

Functions Realized by Control System

Figure 5:
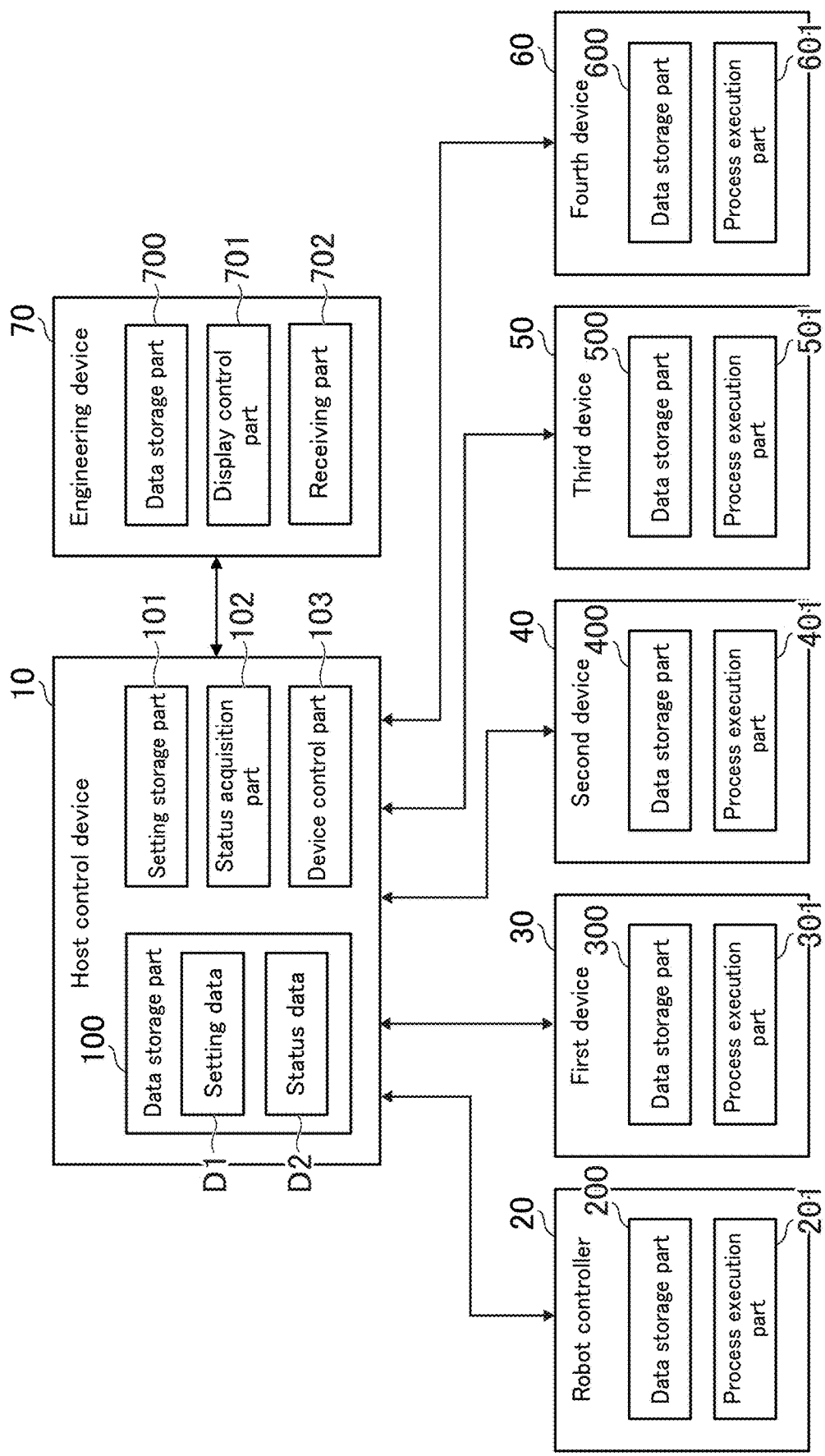
FIG. 5 is a functional block diagram illustrating functions realized by a control system according to an embodiment of the present invention.

FIG. 5 is a functional block diagram illustrating functions realized by the control system 1. In the first embodiment, functions implemented by each of the host control device 10, the robot controller 20, the first device 30, the second device 40, the third device 50, the fourth device 60, and the engineering device 70 are described.

Functions Realized by Host Control Device

As illustrated in FIG. 5, the host control device 10 includes a data storage part 100, a setting storage part 101, a status acquisition part 102, and a device control part 103. The data storage part 100 is mainly realized by the storage part 12. The setting storage part 101, the status acquisition part 102, and the device control part 103 are mainly realized in the CPU 11.

Data Storage Part

The data storage part 100 stores data necessary for controlling multiple devices such as the robot controller 20. In the first embodiment, setting data (D1) and status data (D2) are described as examples of data stored in the data storage part 100.

FIG. 6 illustrates a data storage example of the setting data (D1). The setting data (D1) is data related to settings of the control system 1. In the first embodiment, the setting data (D1) indicates details of settings specified from an engineering tool to be described later. For example, the setting data (D1) includes a process execution order, a process name, an initial flag, cycle information, an ending flag, time information, number-of-units information, priority information, and an execution condition.

The execution order is the order in which the processes with respect to an individual object are executed. The execution order stored in the setting data (D1) is an execution order of the processes when viewed from an individual object (in which order the processes are executed with respect to a certain object). An execution order of the processes when viewed from the control system 1 as a whole (which process is executed with respect to which object after a process with respect to a certain object) is dynamically determined by the device control part 103 to be described later. In the first embodiment, since six processes are executed: the setup process, the first large process, the second large process, the internal setup process, the third large process, and the ending process, the execution order of these six processes is indicated.

The process name is a name of an individual process. The initial flag is information identifying a process to be executed first. In the first embodiment, since the setup process is executed first, the initial flag of the setup process is turned on. The cycle information is information identifying that subsequent processes are not executed unless a process corresponding to the cycle information is completed. In the first embodiment, the cycle information is not used.

The ending flag is information identifying a process to be executed last. In the first embodiment, since the ending process is executed last, the ending flag of the ending process is turned on. With the initial flag and the ending flag, the first process and the last process can be identified, so it is also possible that the execution order is not included in the setting data (D1). In this case, execution conditions may be specified such that the processes are executed in an execution order expected by a user.

The time information is information about a time required to execute a process. In the first embodiment, a case is described where the time information indicates a predicted value of a time required to execute a process. However, it is also possible that the time information indicates a measured value. The predicted value may be a value specified by a user or a value calculated by simulation. As illustrated in FIG. 6, in the first embodiment, the second large process and the third large process are much more time consuming than the other processes. Further, the third large process is more time consuming than the second large process.

The number-of-units information is information about a maximum number of objects that can be arranged. The number-of-units information is specified only for processes in which arrangement of objects occurs. In the first embodiment, the number-of-units information is set only for the setup process, the internal setup process, and the ending process. The number-of-units information for the setup process indicates the maximum number of objects that can be arranged in the first storage place (P1). The number-of-units information for the internal setup process indicates the maximum number of objects that can be arranged in the third storage place (P3). The number-of-units information for the ending process indicates the maximum number of objects that can be arranged in the fourth storage place (P4).

The priority information is information about priority of a process. The priority information may be set for all of the processes, or may be set only for some of the processes. In the data storage example of FIG. 6, the third large process has the highest priority, and the second large process has the second highest priority. No priority is specified for the other processes. The priority information is used to solve Problem 2 (a process cannot be prioritized) in a second embodiment to be described later.

An execution condition is a condition for executing a process. An execution condition can also be a condition that triggers a process. When an execution condition for a certain process is satisfied, the process is executed. In the first embodiment, since there are multiple objects, when an execution condition for a certain process is satisfied, the process is executed with respect to any object with respect to which the process has not yet been executed. As execution conditions, various conditions can be specified. For example, as an execution condition for a certain process, an execution status of another process may be specified. As an execution condition for a certain process, receiving a specific signal from a specific device or sensor may be specified.

In the first embodiment, the order in which the multiple objects are taken out from the first storage place (P1) (indicated by the numbers in the circles illustrated in FIG. 4) is determined. Therefore, when an execution condition for a certain process is satisfied, the process is executed with respect to an object that comes first (object with a smaller number in the circle illustrated in FIG. 4) among objects with respect to which the process has not been executed. For example, when the first large process has been completed up to the third object and, in this state, the execution condition for the first large process is satisfied, the first large process with respect to the fourth object is executed.

When execution conditions for multiple processes are satisfied at the same time, a process to be executed may be selected based on a predetermined priority. In the first embodiment, a case is described where an execution condition is specified as that a variable stored in the data storage part 100 has a predetermined value. However, as an execution condition, any condition can be specified. For example, an execution condition may be that the host control device 10 receives a predetermined signal from another device or sensor. An execution condition may be that a predetermined action is detected by analyzing an image of a vision sensor.

To achieve a task arbitration such as "when Source is Complete and Destination is Ready, a task is executed" described above, as an execution condition for a process for which an execution order is n (n is a natural number), it is specified that a process for which an execution order is n−1 is Complete and a process for which an execution order is n+1 is Ready. In the first embodiment, a case is described where a state of an individual process is indicated in the status data (D2). However, as a method for identifying a state of an individual process, various methods can be used. For example, a state of an individual process may be identified by a variable stored in the data storage part 100 separately from the status data (D2), or by a signal received from a control device or a sensor.

In the first embodiment, in order to solve Problem 1 (a destination is filled), a current number of objects arranged in the third storage place (P3) (hereinafter referred to as a current arrangement number) is prepared. Therefore, in the internal setup process, as an execution condition for a process in which an object is taken out from the second device 40, it is specified that the current arrangement number is less than a maximum number. This maximum number is a value indicated by the number-of-units information of the internal setup process. Other conditions may be included in the execution condition for the internal setup process. For example, that the third large process is Complete may be included in the execution condition for the internal setup process.

Similarly, for the other processes other than the ending process, the execution condition may be only one condition, or may include multiple conditions. In the first embodiment, the execution condition for the other processes may be a similar condition to the above-described task arbitration, or may be a condition described in other embodiments to be described later. In the first embodiment, the execution condition for the other processes may be any condition, and the execution condition for the internal setup process may include a condition related to the current arrangement number.

The information included in the setting data (D1) is not limited to the example of FIG. 6. The setting data (D1) may include information necessary for the device control part 103, which will be described later, to dynamically determine a process to be executed next. For example, the setting data (D1) may include a flag indicating whether or not it is a process for which the device control part 103 dynamically determines whether or not it is executable.

FIG. 7 illustrates a data storage example of the status data (D2). The status data (D2) is data about a current status of the control system 1. In the first embodiment, a case is described where a current status of the control system 1 is managed using variables. A variable is information for which at least one of referencing and changing is performed by a control program. Individual variables are not required to be grouped as the status data (D2) and may be treated as separate data.

For example, the status data (D2) includes a status variable indicating a current execution status of an individual process. A status variable can take one of a first value (corresponding to Ready) indicating that execution preparation for a process has been completed, a second value (corresponding to not Complete) indicating that a process is being executed, and a third value (corresponding to Complete) indicating that a process has been completed.

An initial value of a status variable for each process is the first value. When a process to be executed by a certain device is started, the device control part 103 changes the status variable of this process to the second value. When a notification indicating that the process has been completed is received from this device, the device control part 103 changes the status variable of this process to the third value. A status variable that has taken the third value returns to the first value at a predetermined timing. For example, when a next process of a process for which the status variable has taken the third value is executed, this status variable returns to the first value. A status variable may take other values, such as a value indicating that an error has occurred in a process.

For example, the status data (D2) includes a arrangement number variable indicating a current number of objects arranged in the third storage place (P3). The arrangement number variable has an initial value of 0. For example, when an object is taken out from the second device 40 and arranged in the third storage place (P3) in the internal setup process, the device control part 103 increments the arrangement number variable by one. When an object arranged in the third storage place (P3) is held by the robot 24 and is attached to the third device 50 in the third large process, the device control part 103 decrements the arrangement number variable by one.

The status data (D2) may include a variable of any type, and types of variables are not limited to the examples described above. For example, the status data (D2) may include an object variable indicating a current status of an individual object. In the data storage example of FIG. 7, the object variable indicates processes that have been executed with respect to an object, and, for a first object and a second object, it means that all six processes have been completed and the objects have been arranged in the fourth storage place (P4). For an n-th object, it means that none of the processes have been completed and the object has not been loaded in the first storage place (P1).

For example, the status data (D2) may include a variable indicating a current position of an object, or a variable indicating a physical quantity detected by a sensor. The status data (D2) may include information other than variables. For example, the status data (D2) may include information indicating at least one of a start time and an end time of an individual process. The status data (D2) may include current date and time of the control system 1. The current date and time may be managed with general information such as year, month and day, or with information such as a timer value.

Further, the data stored by the data storage part 100 is not limited to the above examples. For example, the data storage part 100 stores a control program. The control program is a program for controlling devices such as the robot controller 20. The control program can be written in any language, such as a ladder language or a robot language. The control program includes code for determining whether or not an execution condition for an individual process is satisfied based on the setting data (D1) and the status data (D2), and code for executing on a device a process corresponding to an execution condition that has been determined to be satisfied. The data storage part 100 may store a parameter referenced by the control program. The data storage part 100 may store other programs such as firmware.

Setting Storage Part

The setting storage part 101 stores a setting specified by a user about an execution condition for at least one process among multiple processes. This setting may be the execution condition itself (for example, the execution condition included in the setting data (D1)) or may be information (for example, the time information included in the setting data (D1)) necessary for determining whether or not the execution condition is satisfied. Storing a setting means to record data indicating details of the setting in the data storage part 100. A setting stored in the setting storage part 101 can be retrieved at any time.

In the first embodiment, since a setting specified by a user is included in the setting data (D1), the setting storage part 101 stores the setting by recording the setting data (D1) in the data storage part 100. It is also possible that a setting specified by a user is incorporated as a part of the control program rather than being stored as the setting data (D1). In this case, the setting storage part 101 may store the setting by recording the control program in the data storage part 100.

For example, settings include an execution order of two or more processes with respect to one object. In the data storage example of FIG. 6, settings indicated by the setting data (D1) include an execution order and a process name. Process names in FIG. 6 are relatively general process names. However, more detailed process names may be included. For example, between two or more processes, there is a moving process in which an object is moved. In this case, a process name of the moving process may be included in the settings.

For example, a setting may be a maximum number of objects that can be arranged in the third storage place (P3). The third storage place (P3) is an example of a buffer. Therefore, a part describing the third storage place (P3) can be read as a buffer. A buffer is a place where an object is temporarily arranged. A buffer may be any place where an object can be arranged, such as a workbench, a shelf, a box, or a case.

In the first embodiment, since the third large process is executed with respect to an object arranged in the third storage place (P3), the maximum number included in the settings can also be a maximum number of objects that can wait for execution of the third large process among multiple processes. Since an object for which the second large process and the internal setup process have been completed is arranged in the third storage place (P3), the maximum number included in the settings can be a maximum number of objects that can be arranged after the second large process and the internal setup process have been completed.

In the data storage example of FIG. 6, the maximum number is indicated in the number-of-units information of the internal setup process. Therefore, the setting storage part 101 stores the maximum number by storing the number-of-units information of the internal setup process included in the setting data (D1). The maximum number may be included as a part of the execution condition for the third large process. In this case, the setting storage part 101 stores the maximum number by storing the execution condition for the third large process included in the setting data (D1).

Status Acquisition Part

The status acquisition part 102 acquires a current status of the control system 1. In the first embodiment, since the status data (D2) indicates the current status, the status acquisition part 102 acquires the current status by acquiring the status data (D2). When the status data (D2) is stored in a device or memory other than the host control device 10, the status acquisition part 102 acquires the status data (D2) from the device or memory.

When the current status is provided as a separate variable from the status data (D2) rather than being included in the status data (D2), the status acquisition part 102 may acquire the current status by acquiring the variable. Further, when the current status is identified by a signal from a sensor, the status acquisition part 102 acquires the current status by receiving the signal from the sensor. For example, the status acquisition part 102 may acquire the current status by analyzing an image received from a vision sensor.

For example, a status acquired by the status acquisition part 102 is a current number of objects arranged in the third storage place (P3) in the control system 1. The status acquisition part 102 acquires the arrangement number variable included in the status data (D2). For example, a status acquired by the status acquisition part 102 is a status of each of the second device 40 and the third device 50. The status acquisition part 102 acquires a status of each of the second device 40 and the third device 50 by acquiring a status variable included in the status data (D2).

Device Control Part

The device control part 103 dynamically determines a process to be executed next among multiple processes and controls multiple devices based on the settings stored by the setting storage part 101 and the status acquired by the status acquisition part 102. For example, the device control part 103 determines a process related to either the second device 40 or the third device 50 as a process to be executed next. The device control part 103 determines which process with respect to which object to be executed next among multiple objects and multiple processes.

In other words, the device control part 103 determines a combination of an object and a process to be executed next among combinations of multiple objects and multiple processes. When the total number of objects in the control system 1 is k (k is an integer of 2 or more, and k=13 in the case of FIG. 4) and the total number of processes to be executed with respect to one object is m (m is a natural number, m=6 in the first embodiment), considering the control system 1 as a whole, there are k×m combinations of objects and processes (13×6=78 in the case of FIG. 4). An execution order of the k×m combinations is instantly dynamically determined by the device control part 103 rather than being specified by a user.

For example, the device control part 103 executes the control program and determines whether or not individual execution conditions included in the setting data (D1) are satisfied based on the status data (D2). When an execution condition of any process is satisfied, the device control part 103 transmits an instruction for starting the process to a device executing the process. This instruction may be a command indicating identification information of the process to be executed, or may be an instruction for changing a start variable associated with a process program, which will be described later, to a predetermined value. Further, this instruction may include information identifying with respect to which object the process is. For example, when the setup process is executed, by including this information, the robot controller 20 can identify which object in the first storage place (P1) is to be held. For example, similarly for the third large process, the robot controller 20 can identify which object in the third storage place (P3) is to be held.

In the first embodiment, the multiple devices includes at least one robot 24 that executes a moving process in which an object is moved between the multiple devices. Therefore, based on the settings stored by the setting storage part 101 and the status acquired by the status acquisition part 102, when one process by one device is completed, the device control part 103 determines a moving process by the robot 24 as a process to be executed next so that other processes by other devices are executed.

For example, a moving process in which an object is moved from the second device 40 to the third storage place (P3) is one of processes included in the internal setup process. When the second device 40 has completed the processing process with respect to an object, the device control part 103 determines, as a process to be executed next, a moving process in which the robot 24 moves the object from the second device 40 to the third storage place (P3) so that the processing process by the third device 50 is executed.

For example, a moving process in which an object is moved from the third device 50 to the fourth device 60 is one of processes included in the ending process. When the third device 50 has completed the processing process with respect to an object, the device control part 103 determines, as a process to be executed next, a moving process in which the robot 24 moves the object from the third device 50 to the fourth device 60 so that the cleaning process by the fourth device 60 is executed. Other moving processes may be similarly executed so that an object with respect to which a process by a certain device has been completed is moved to a device of the next process.

For example, based on the settings stored by the setting storage part 101, the device control part 103 may determine a moving process by the robot 24 as a process to be executed next so that two or more processes are executed with respect to one object in an execution order included in the settings. The device control part 103 determines a moving process by the robot 24 as a process to be executed next such that an execution order included in the setting data (D1) is maintained with respect to one object.

For example, when the processing process by the second device 40 has been completed, the device control part 103 determines, as a process to be executed next, a moving process in which the robot 24 moves an object from the second device 40 to the third storage place (P3) so that the processing process by the third device 50 is executed. When the processing process by the third device 50 has been completed, the device control part 103 determines, as a process to be executed next, a moving process in which the robot 24 moves an object from the third device 50 to the fourth device 60 so that the cleaning process by the fourth device 60 is executed.

In the first embodiment, there is the third storage place (P3) where multiple objects are arranged waiting for execution of one or more subsequent processes (the processing process by the third device 50 in the third large process) among multiple processes. Therefore, based on the settings stored by the setting storage part 101 and the status acquired by the status acquisition part 102, the device control part 103 determines, as a process to be executed next, a moving process by the robot 24 so that, when a preceding process (the processing process by the second device 40 in the second large process) before a subsequent process is completed, an object is moved to the third storage place (P3), and, when the subsequent process is executed, the object is moved from the third storage place (P3).

For example, a status indicated by the status data (D2) is a current number of objects arranged in the third storage place (P3) in the control system 1. The device control part 103 does not determine a preceding process (the processing process by the second device 40 in the second large process) as a process to be executed next when the current number has reached the maximum number, and can determine a preceding process as a process to be executed next when the current number has not reached the maximum number. The device control part 103 determines whether or not a value indicated by the arrangement number variable in the status data (D2) has reached the maximum number. A subsequent process and a preceding process are not limited to the above examples. A succeeding process may be a process that is relatively later in the execution order. A preceding process may be a process that is relatively earlier in the execution order.

For example, based on the number-of-units information included in the setting data (D1) and the arrangement number variable included in the status data (D2), the device control part 103 determines whether or not the current number of objects waiting for execution of the third large process has reached the maximum number. When the current number of objects waiting for execution of the third large process has reached the maximum number, the device control part 103 does not determine a process before the third large process as a process to be executed next. For example, when the arrangement number variable has not reached the maximum number, the device control part 103 can determine a preceding process before the processing process by the third device 50 as a process to be executed next. Here, a case is described where a moving process in which an object is moved to the third device 50 corresponds to a preceding process. However, a preceding process may be an even earlier process.

In the first embodiment, one of execution conditions for the processing process by the third device 50 is that the current number has not reached the maximum number. Therefore, the device control part 103 determines a moving process of an object to the third device 50 as a process to be executed next. The device control part 103 does not have to execute a moving process of object to the third device 50 even though this condition is satisfied. The device control part 103 does not execute this process unless other conditions for this process are satisfied. That the current number has not reached the maximum number may be one of the conditions. In addition, for example, when an execution condition for another process having a higher priority is satisfied, the device control part 103 may execute that process.

Functions Realized by Devices Such As Robot Controller

In the robot controller 20, the first device 30, the second device 40, the third device 50, and the fourth device 60, data storage parts (200, 300, 400, 500, 600) and process execution parts (201, 301, 401, 501, 601) are realized. The data storage parts (200, 300, 400, 500, 600) are respectively mainly realized by the storage parts (22, 32, 42, 52, 62). The process execution parts (201, 301, 401, 501, 601) are respectively mainly realized by CPUs (21, 31, 41, 51, 61).

In the following, the data storage part 200 and the process execution part 201 are described. However, a process execution flow itself is the same for any device. Therefore, the data storage parts (300, 400, 500, 600) and the process execution parts (301, 401, 501, 601) may be respectively the same as the data storage part 200 and the process execution part 201. The data storage part 200 may be read as each of the data storage parts (300, 400, 500, 600), and the process execution part 201 may be read as each of the process execution parts (301, 401, 501, 601).

Data Storage Part

The data storage part 200 stores data necessary for executing a process. For example, the data storage part 200 stores a process program. A process program is prepared for each process. A process program defines individual actions in a process. For example, the data storage part 200 stores variables for which at least one of referencing and changing is performed by a process program. The variables include a variable as an execution condition for executing a process program. For example, for each process program, a start variable for starting execution of a process and an end variable indicating an end of execution of the process may be prepared. It is also possible that the end variable is omitted. It is also possible that execution of a process program is controlled by a command from the host control device 10 rather than by a variable.

Process Execution Part

The process execution part 201 executes a process based on a process program. In the first embodiment, since a start variable and an end variable are prepared for each process program, the process execution part 201 monitors whether or not the start variable has changed to a predetermined value. The start variable of a process program is changed to a predetermined value when an instruction to set the start variable to the predetermined value is received from the host control device 10. The change of the start variable may be realized by a functional block other than the process execution part 201. Upon detecting that the start variable has changed to the predetermined value, the process execution part 201 executes a process program corresponding to the start variable, and starts execution of the process. When the started process has ended, the process execution part 201 changes the end variable of the process program corresponding to the process to a predetermined value. The process execution part 201 notifies the host control device 10 of that the execution of the process has been completed. After that, the start variable returns to an initial value at a predetermined timing.

Functions Realized by Engineering Device

As illustrated in FIG. 5, the engineering device 70 includes a data storage part 700, a display control part 701, and a receiving part 702. The data storage part 700 is mainly realized by the storage part 72. The display control part 701 and the receiving part 702 are mainly realized by the CPU 71.

Data Storage Part

The data storage part 700 stores data necessary for performing setting in the control system 1. For example, the data storage part 700 stores an engineering tool. An engineering tool is a tool for supporting a setting work of a user. For example, an engineering tool is used for various purposes such as creation of various programs such as the control program and the process programs, parameter setting, communication setting between devices, register definition, or variable definition. For example, the data storage part 700 may store a program created by a user using the engineering tool or a backup of a parameter.

Display Control Part

The display control part 701 displays, on the display part 75, a setting screen for setting using an engineering tool. FIG. 8 illustrates an example of the setting screen. As illustrated in FIG. 8, a setting screen (G1) is a graphical user interface for specifying values of individual items included in the setting data (D1). A user can input any value on the setting screen (G1). Although omitted in FIG. 8, it is possible to specify a condition such as a variable as an execution condition of a process.

Receiving Part

The receiving part 702 receives various operations by a user. For example, the receiving part 702 receives specification of values of individual items with respect to the setting screen (G1). Based on the values received by the receiving part 702, the engineering device 70 generates the setting data (D1) and writes the setting data (D1) to the data storage part 100 of the host control device 10. It is also possible that the setting data (D1) is stored in the data storage part 700.

Processing Executed by Control System

Figure 9:
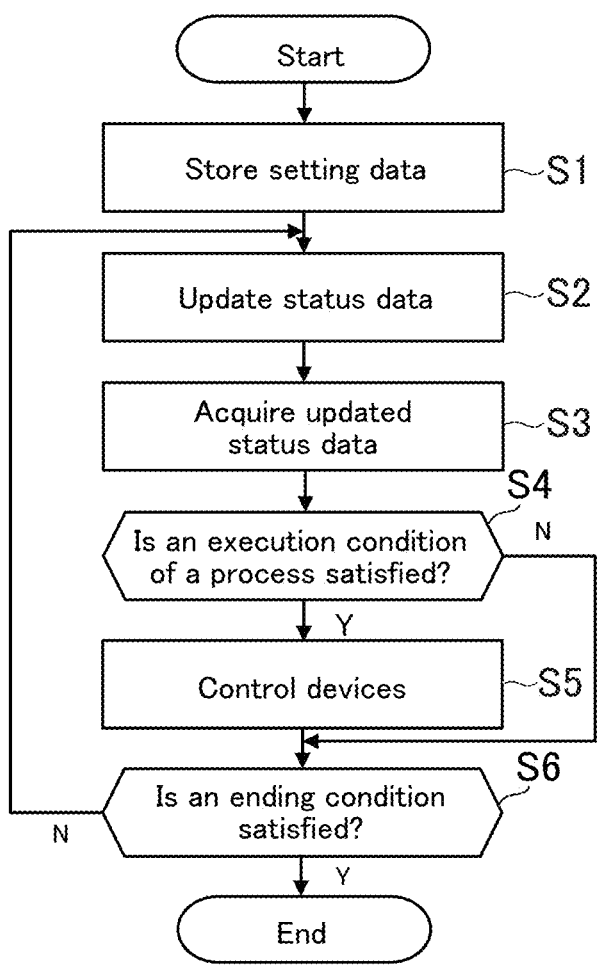
FIG. 9 is a flow diagram illustrating an example of processing executed by a control system according to an embodiment of the present invention.

FIG. 9 is a flow diagram illustrating an example of processing executed by the control system 1. In FIG. 9, of processing executed in the control system 1, processing executed by the host control device 10 is illustrated. The CPU 11 executes the control program stored in the storage part 12, and thereby, the processing illustrated in FIG. 9 is executed. The processing illustrated in FIG. 9 is an example of processing executed by the functional blocks illustrated in FIG. 5.

As illustrated in FIG. 9, the host control device 10 stores the setting data (D1) in the storage part 12 (51), and updates the status data (D2) stored in the storage part 12 to indicate the current status of the control system 1 (S2). In S2, for example, the host control device 10 updates the status data (D2) based on details of communication with a device such as the robot controller 20. For example, the host control device 10 updates the status data (D2) based on an execution result of the control program.

The host control device 10 acquires the updated status data (D2) (S3), and, based on the setting data (D1) stored in S1 and the updated status data (D2) acquired in S3, determines whether or not execution conditions for individual processes are satisfied (S4). In S4, as described above, whether or not an execution condition is satisfied is determined for each process. For example, when an object is taken out from the second device 40 in the internal setup process, the host control device 10 determines whether or not an execution condition is satisfied based on the number-of-units information indicated by the setting data (D1) and the arrangement number variable indicated by the status data (D2). Details of this determination method are as described later.

When there is a process for which an execution condition is satisfied (S4: Y), the host control device 10 determines the process for which the execution condition is satisfied as a process to be executed next, and controls a device such as the robot controller 20. In S5, the host control device 10 transmits a command for causing the process to start (for example, a command for changing the start variable of the process program to a predetermined value) to a device that executes the process for which the execution condition is satisfied.

On the other hand, when there is no process for which an execution condition is satisfied (S4: N), the host control device 10 determines whether or not a predetermined ending condition is satisfied (S6). The ending condition may be any condition for ending the present processing. For example, when the control program is written in the ladder language, that a last command written in the ladder language is executed corresponds to that the ending condition is satisfied. For example, when the total number of objects is predetermined, that the six processes with respect to all the objects are completed and all the objects become finished products corresponds to that the ending condition is satisfied. When it is determined that the ending condition is not satisfied (S6: N), the processing returns to S2, and a process with respect to an object that has not yet become a finished product is executed. When it is determined that the ending condition is satisfied (S6: Y), the present processing ends.

As described above, the control system 1 of the first embodiment includes multiple devices that each independently execute at least one of multiple processes with respect to multiple objects with respect to each of which the multiple processes are to be executed. The control system 1 dynamically determines a process to be executed next among the multiple processes and controls the multiple devices based on a setting specified by a user about an execution condition for at least one process among the multiple processes and the current status of the control system 1. As a result, multiple processes with respect to multiple objects can be concurrently executed, and thus, the operation efficiency of the control system 1 increases. For example, it is possible that a creator of the control program estimates time required for each process and manually specifies an execution order for the multiple processes so as to improve efficiency. However, in the control system 1 in which multiple processes are concurrently executed with respect to multiple objects, there are an infinite number of scheduling possibilities and it is difficult to predict what execution order will improve the operation efficiency. For example, a time estimated by the creator and a time actually taken in the control system 1 may differ, and when there is a process that takes an unexpectedly long time, until this process is completed, a process to be executed next cannot be started, and the operation efficiency of the control system 1 may decrease. In this regard, according to the control system 1, the processes are not executed in a static execution order specified by the creator, but the execution order of the processes is dynamically determined according to the status of the control system 1. Therefore, the operation efficiency increases according to the actual status of the control system 1.

Further, the multiple devices of the control system 1 include at least one robot 24 that executes a moving process in which an object is moved between the multiple devices.

When one process by one device is completed, the control system 1 determines a moving process by the robot 24 as a process to be executed next so that another process by another device is executed. As a result, even when a degree of freedom in movement of an object in the control system 1 is high, the object can be moved so that overall operation efficiency increases.

Further, the settings of the control system 1 include an execution order for two or more processes with respect to one object. There is a moving process between two or more processes. The control system 1 determines a moving process by the robot 24 as a process to be executed next so that two or more processes are executed with respect to one object in the execution order included in the settings. As a result, processes are dynamically executed such that an execution order with respect to one object is maintained. Therefore, it is possible to execute processes with respect to one object according to an expected execution order while improving the operation efficiency of the control system 1.

Further, the control system 1 has the third storage place (P3) where multiple objects are arranged waiting for execution of one or more subsequent processes among the multiple processes. The control system 1 determines a moving process by the robot 24 as a process to be executed next so that, when a preceding process before a subsequent process is completed, an object is moved to the third storage place (P3), and when the subsequent process is executed, the object is moved from the third storage place (P3). As a result, it is possible to prevent that a preceding process cannot be executed until a succeeding process is completed, and thus, the operation efficiency of the control system 1 increases.

Further, a setting in the control system 1 is the maximum number of objects that can be arranged in the third storage place (P3). A status is the current number of objects arranged in the third storage place (P3) in the control system 1. The control system 1 does not determine a preceding process as a process to be executed next when the current number has reached the maximum number, and can determine a preceding process as a process to be executed next when the current number has not reached the maximum number. As a result, the third storage place (P3) can be prevented from being filled up. As a result, for example, it is possible to prevent that an object cannot be arranged in the third storage place (P3) and the control system 1 stops due to occurrence of an error, or to prevent objects in the third storage place (P3) from coming into contact with each other. For example, after the current arrangement number has reached the maximum number, until the current arrangement number decreases, other processes that do not affect the number of objects waiting for execution of processing by the third device 50 in the third large process are executed. Thereby, the operation efficiency of the control system 1 can be improved.

Second Embodiment

In the second embodiment, a structure that solves Problem 2 (a process cannot be prioritized) is described. In the second embodiment, description about structural elements that are the same as those in the first embodiment is omitted.

As described in the first embodiment, the processing process by the second device 40 and the processing process by the third device 50 are much more time consuming than the other processes. Therefore, causing the second device 40 and the third device 50 to operate as fully as possible improves the operation efficiency of the control system 1 as a whole. Further, since the processing process by the third device 50 is more time consuming than the processing process by the second device 40, causing the third device 50 to fully operate improves the operation efficiency of the control system 1 as a whole.

Figure 10:
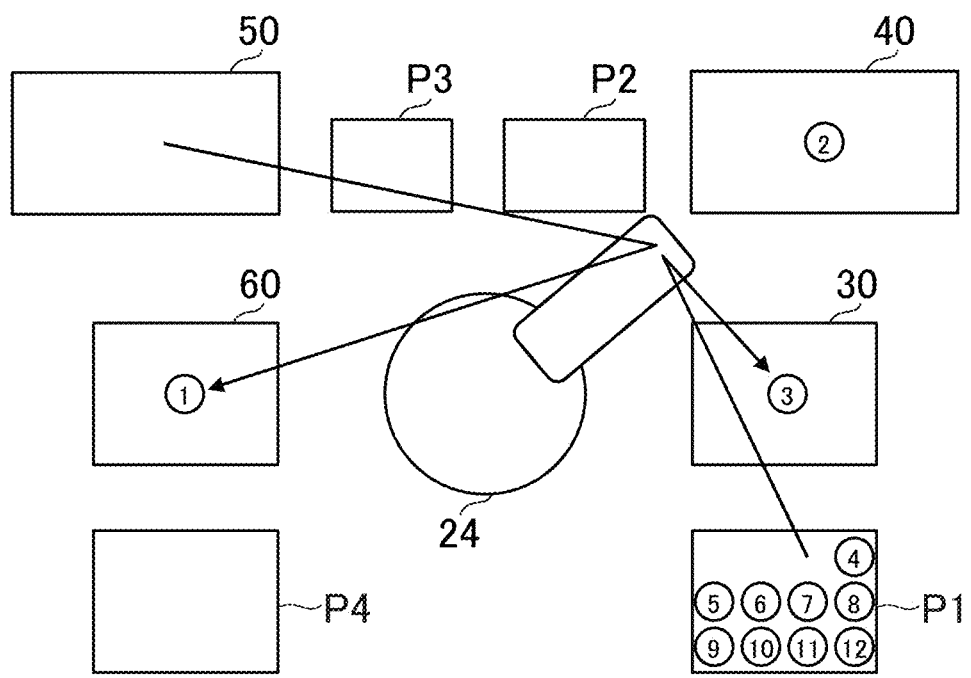
FIG. 10 is an explanatory diagram of Problem 2 (a process cannot be prioritized)

FIG. 10 is an explanatory diagram of Problem 2 (a process cannot be prioritized). In the example of FIG. 10, the processing process by the third device 50 with respect to a first object has been completed. In this case, in order to cause the third device 50 to fully operate, it is better that the first object is taken out from the third device 50 and a second object is attached to the third device 50 as soon as possible.

However, when an individual process is not prioritized, other processes are executed, and operation efficiency of the third device 50 cannot be increased. For example, when a moving process with respect to a third object is executed instead of executing a moving process with respect to the second object, during this time, the third device 50 remains Ready and waits without doing anything, and thus, the operation efficiency of the third device 50 decreases accordingly.

Therefore, the host control device 10 of the second embodiment gives the highest priority to the processing process by the third device 50, and thereby, solves Problem 2 by causing the third device 50 to fully operate, and improves the operation efficiency of the control system 1. With this prioritization, when processing by the third device 50 with respect to a certain object and taking out the object from the third device 50 have been executed, all processes with respect to an immediately next object up to attaching the object to the third device 50 are executed with priority. In the following, details of the control system 1 of the second embodiment are described.

Figure 11:
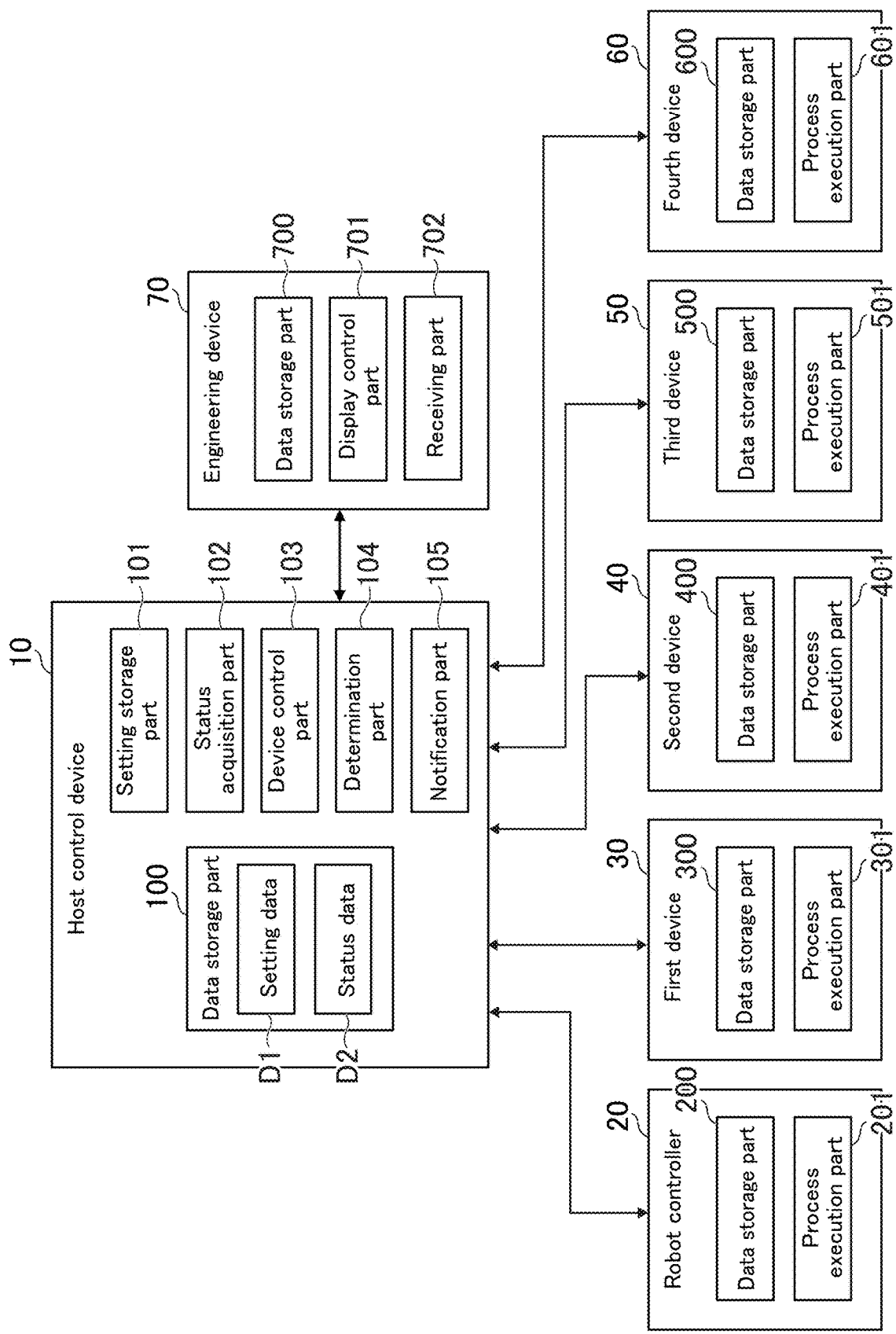
FIG. 11 illustrates an example of a functional block diagram according to a second embodiment of the present invention.

FIG. 11 illustrates an example of a functional block diagram in the second embodiment. As illustrated in FIG. 11, in the second embodiment, in addition to the functions described in the first embodiment, a determination part 104 and a notification part 105 are realized. The determination part 104 and the notification part 105 are mainly realized by the CPU 11. Other functions are generally similar to those in the first embodiment, but some functions are different from those in the first embodiment.

For example, a setting stored by the setting storage part 101 is a priority corresponding to an execution time of a process. In the example of FIG. 6, the setting data (D1) includes priority information. Therefore, the setting storage part 101 stores the priority information of the setting data (D1) as a setting. The setting storage part 101 stores priority information for each of the processing process by the second device 40 and the processing process by the third device 50. When priority information is set for other processes, the setting storage part 101 stores the priority information for the other processes. In the second embodiment, the higher is the time indicated by the time information, the higher is the priority. It is also possible that the priority is determined by other factors. For example, it is also possible that, when a process is executed multiple times, the more times the process is executed, the higher is the priority.

In the second embodiment, a status acquired by the status acquisition part 102 is an execution status of the third large process with a relatively high priority among the multiple processes. The third large process is an example of a priority process. Therefore, a part describing the third large process can be read as a priority process. A priority process is a process having a relatively higher priority than other processes. A priority process has a higher priority than one or more other processes. A priority process is not limited to a process having the highest priority, and may be a process having the second or lower priority. For example, the second large process may correspond to a priority process.

In the second embodiment, when the third large process with respect to one object has been completed, the device control part 103 determines a moving process related to the third large process as a process to be executed next so that the one object is moved from the third device 50 that executes the third large process and another object is moved to the third device 50. For example, the device control part 103 determines a process to be executed next so that an object (A) with respect to which the processing process by the third device 50 has been completed in the third large process is moved from the third device 50 and all processes up to the processing process by the third device 50 in the third large process are continuously executed with respect to a next object (B). The next object means an object whose order of being taken out from the first storage place (P1) is one after. When the above one object is the k-th object, the (k+1)-th object corresponds to the next object.

For example, when the third large process is completed, the device control part 103 preferentially determines, as a process to be executed next, a moving process related to the third large process over a moving process related to a process having a relatively low priority. In other words, when there are multiple executable moving processes in the control system 1, the device control part 103 preferentially executes a moving process in which an object is moved from the third device 50 and a moving process in which another object is moved to the third device 50 over other moving processes among the multiple moving processes that can be executed.

The device control part 103 may make executable processes other than a moving process in which an object is taken out from the third device 50 on condition that the processing process by the third device 50 has not been completed. Such an execution condition is defined in the setting data (D1). While the processing process by the third device 50 is being executed, processes other than taking out an object from the third device 50 in the ending process are executed. A process to become executable may be any process. A process that has become executable does not necessarily have to be executed, but only needs to be allowed to be executed.

For example, the device control part 103 may make executable processes other than a moving process in which an object is moved to the third device 50 on condition that preparation for the processing process by the third device 50 has not been completed and a moving process in which an object is moved to the third device 50 has not been completed. Such an execution condition is defined in the setting data (D1). That a process to become executable may be any process is as described above.

A method of preferentially executing the processing process by the third device 50 having a relatively high priority is not limited to the above example. For example, the device control part 103 may determine whether or not execution conditions are satisfied in order of priority of processes, and execute processes for which execution conditions are satisfied. When there are multiple processes for which execution conditions are satisfied, the device control part 103 may execute a process having a relatively high priority.

The determination part 104 determines whether or not an execution time of the third large process is equal to or larger than a threshold. The threshold may be specified by a user or may be a predetermined fixed value. The determination part 104 starts timing processing after execution of the third large process is started and determines whether or not a time from the start of the execution of the third large process to the present time is equal to or larger than a threshold. The determination part 104 may measure a non-operating time during which the third device 50 corresponding to the third large process is non-operating, and determine whether or not the non-operating time is equal to or larger than a threshold.

The notification part 105 notifies the user when the determination part 104 has determined that the execution time is equal to or larger than the threshold. The notification can be performed by any means, for example, the notification may be performed by a message such as an e-mail, an information output to the engineering device 70, an alert output using an LED light or the like, or an audio output. The notification part 105 may notify the user when it is determined that the non-operating time is equal to or larger than the threshold.

When the processing process by the third device 50 with respect to one object has been completed, the control system 1 of the second embodiment determines a moving process related to the third large process as a process to be executed next so that the one object is moved from the third device 50 and another object is moved to the third device 50. As a result, the processing process by the third device 50 in the third large process having a relatively high priority can be preferentially executed, and thus, the operation efficiency of the control system 1 further increases.

Further, when the third large process is completed, the control system 1 preferentially determines, as a process to be executed next, a moving process related to the third large process over a moving process related to a process having a relatively low priority. As a result, an object can be quickly moved to the third device 50 that executes the processing process having a relatively high priority. As a result, the operation efficiency of the control system 1 further increases.

Further, the control system 1 notifies the user when it is determined that the execution time of the third large process is equal to or greater than the threshold. As a result, the user can easily notice that the execution of the third large process having a relatively high priority takes time. When there is room for change in the settings of the control system 1, it is easier for a user to consider a setting change.

Third Embodiment

The processing of the first embodiment and the second embodiment may be executed as processing on a simulator, rather than as processing in which the devices are actually caused to operate. That is, the processing of the first embodiment and the second embodiment may be processing in a case where a virtual host control device 10 on the simulator virtually controls devices such as a virtual robot controller 20 on the simulator. In a third embodiment, description about structural elements that are the same as those in the first embodiment and the second embodiment is omitted.

The simulator is a program for simulating the processes. In the third embodiment, a case is described where the simulator is installed on the engineering device 70. However, it is also possible that the simulator is installed on another device such as the host control device 10. Further, a case is described where the simulator is a part of the engineering tool. However, it is also possible that the simulator is a separate program from the engineering tool. For example, when a user selects a button (B10) on the setting screen (G1) in FIG. 8, a simulation screen for executing simulation is executed on the display part 75.

Figure 12:
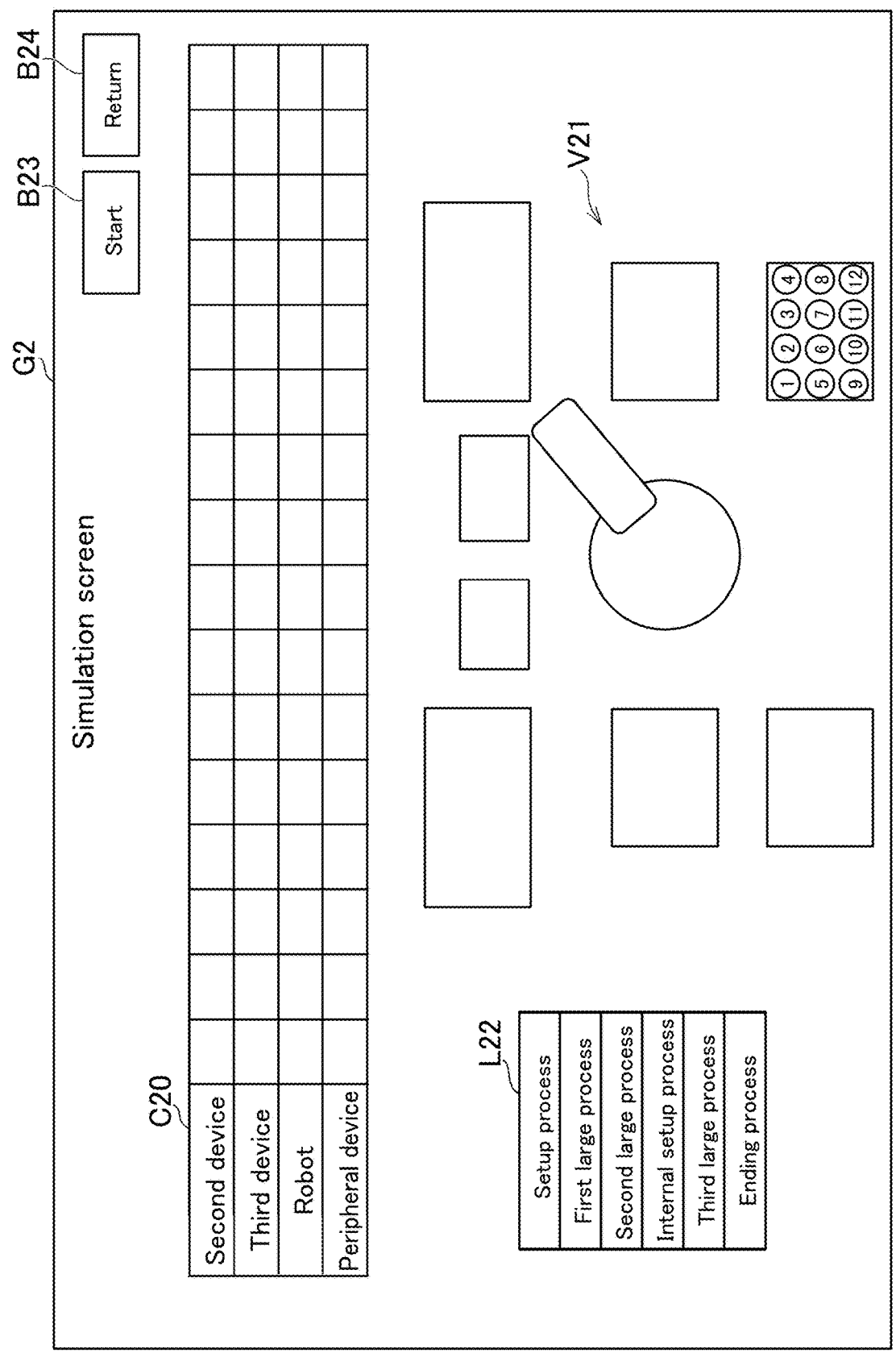
FIG. 12 illustrates an example of a simulation screen according to an embodiment of the present invention.

FIG. 12 illustrates an example of the simulation screen. On a simulation screen (G2), a chart (C20), a virtual space (V21), a list (L22), and buttons (B23, B24) are displayed. For example, when a user selects the button (B23), the simulation starts. An execution result of the simulation is displayed as an animation on the simulation screen (G2). When the user selects the button (B24), it returns to the setting screen (G1). The user can redo the settings by referring to the execution result of the simulation.

The chart (C20) is an image showing time-series simulation results. The chart (C20) may be an image called a time chart or a Gantt chart. In the example of FIG. 12, a case is described where the second device 40, the third device 50, the robot 24, and a peripheral device are shown in the chart (C20). However, any device may be shown in the chart (C20). A user may be able to specify the devices shown in the chart (C20). Device names are arranged in a vertical direction in the chart (C20). A horizontal direction of the chart (C20) is the time axis.

The chart (C20) is not limited to the example of FIG. 12, and may have other layouts. For example, it is also possible that the device names are arranged in the horizontal direction and the vertical direction is the time axis. In addition, for example, process names may be displayed in the chart (C20), and, for each individual object, an execution status of a process with respect to the object may be displayed in the chart (C20). The virtual space (V21) is a space in which an arrangement of the devices in a real space is reproduced. It is also possible that the arrangement of the devices in the virtual space (V21) can be specified by a user. The list (L22) displays the names of the processes.

Figure 13:
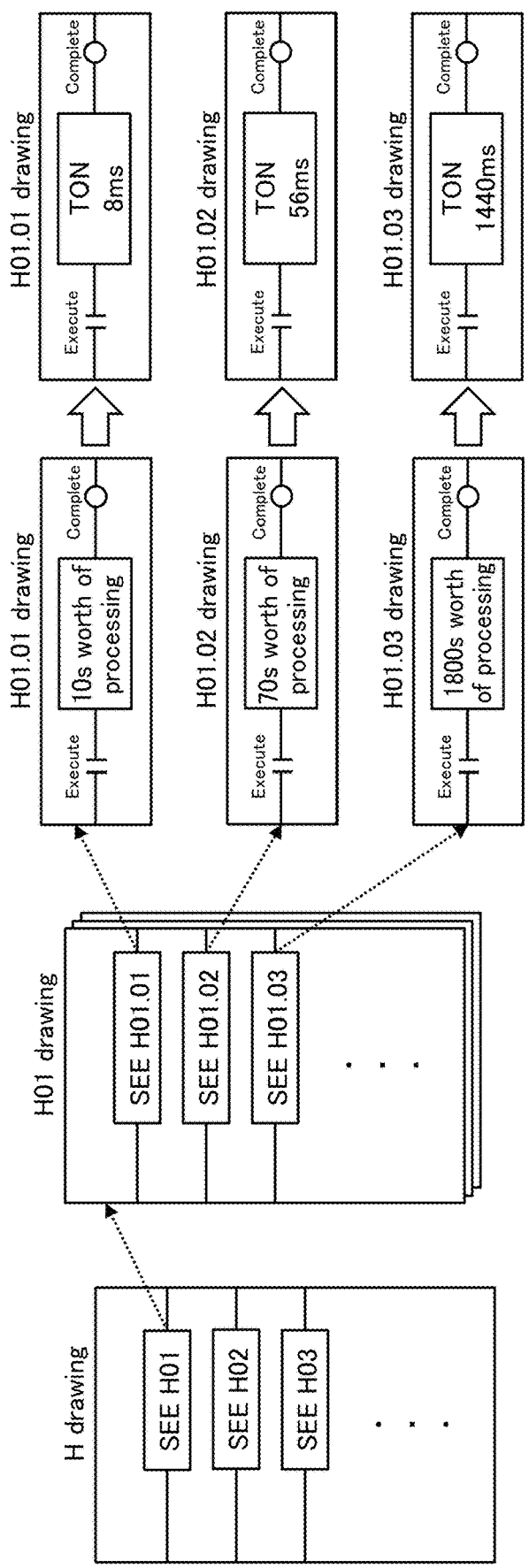
FIG. 13 illustrates an example of a method for realizing a simple simulation according to an embodiment of the present invention.

In the third embodiment, a case is described as an example where simulation is accelerated by executing a simple simulation by replacing the processing of the control program actually executed by the host control device 10 with other processing. In the following, a control program written in the ladder language is described as an example. However, for control programs written in other languages such as the robot language, similarly, processing in a control program can be replaced with other processing. The simulation is not limited to a simple simulation, and may be a detailed simulation that more faithfully reproduces the processing of the control program. A program showing processing procedures in the simulator may be created by a user rather than being generated based on a control program as in the third embodiment. FIG. 13 illustrates an example of a method for realizing a simple simulation. In FIG. 13, a ladder diagram of a control program is illustrated. A "H drawing" in FIG. 13 is a highest level drawing in the ladder diagram. For example, the "H drawing" can call a lower level drawing with a SEE command. In the example of FIG. 13, the "H drawing" can call a lower level drawing "H01 drawing" with a command "SEE H01." Similarly, the "H01 drawing" can call a further lower level drawing.

In the example of FIG. 13, a drawing two levels below the "H drawing" includes specific processing for controlling the robot controller 20, and the like. For example, when details of the setting data (D1) are as illustrated in FIG. 6, the setup process that is expected to take 10 seconds is executed first. Therefore, a "H01.01 drawing," which corresponds to the setup process, includes 10 seconds worth of processing. For example, when a peripheral device such as a carrying robot carries an object to the first storage place, the "H01.01 drawing" includes a series of processing steps such as moving the peripheral device to the first storage place (P1) and arranging a box containing the object in the first storage place (P1).

In the third embodiment, the 10 seconds worth of processing included in the "H01.01 drawing" is replaced with a timer command ("TON" in FIG. 13). Since the user has specified 10 seconds for the setup process on the setting screen (G1) in FIG. 6, it may be replaced with a 10-second timer command. However, in the third embodiment, it is replaced with a timer command that is compressed to a shorter time in order to speed up the simulation. For example, the engineering device 70 replaces a timer command based on a minimum value of a planned time and a minimum value of a scan period.

A planned time is a time required to execute a process. The user specifies a planned time on the setting screen (G1). Any value may be specified for a planned time. However, in the third embodiment, it is specified to be an integer multiple of a predetermined minimum value. The minimum value of the planned time may be any value, and here it is set to be 5 seconds. The scan period is a processing period of the control program. The control program executes processing for each scan period. The minimum value of the scan period may be any value, and here it is set to be 4 milliseconds. The minimum value of the planned time and the minimum value of the scan period each may be specified by a user or each may be a fixed value.

For example, the 10 seconds worth of processing in the "H01.01 drawing" is processing that requires twice the time of 5 seconds, which is the minimum value of the planned time. Therefore, this processing is replaced with a timer command of 8 milliseconds ("TON 8 ms" in FIG. 13), which is twice the time of 4 milliseconds, which is the minimum value of the scan period. Similarly, 70 seconds worth of processing of a "H01.02 drawing" corresponding to the first large process is processing that requires 14 times the time of 5 seconds, which is the minimum value of the planned time, and thus, is replaced with a timer command of 56 milliseconds ("TON 56 ms" in FIG. 13), which is 14 times the time of 4 milliseconds, which is the minimum value of the scan period. 1,800 seconds worth of processing of a "H01.03 drawing" corresponding to the second large process is processing that requires 360 times the time of 5 seconds, which is the minimum value of the planned time, and thus, is replaced with a timer command of 1,440 milliseconds ("TON 1,440 ms" in FIG. 13), which is 360 times the time of 4 milliseconds, which is the minimum value of the scan period.

The engineering device 70 replaces all the processes with timer commands of compressed times as described above. A process for which the user has not specified a planned time may be replaced with a timer command of a predetermined time, or may be replaced with a timer command of a time obtained by predicting a planned time according to processing details and then compressing the predicted planned time.

When it is replaced with a timer command of a time obtained by compressing a planned time, the engineering device 70 executes a simple simulation. For the simulation, various commonly known simulation methods may be used. With the planned times in FIG. 6, completion of all the processes with respect to a certain object requires 5,540 seconds. By compressing the planned times, simulation of all the processes with respect to this object can be completed in ((5,540 seconds)/(5 seconds))*(4 milliseconds)=4,432 milliseconds. A simulation result is displayed on the simulation screen (G2).

Figure 14:
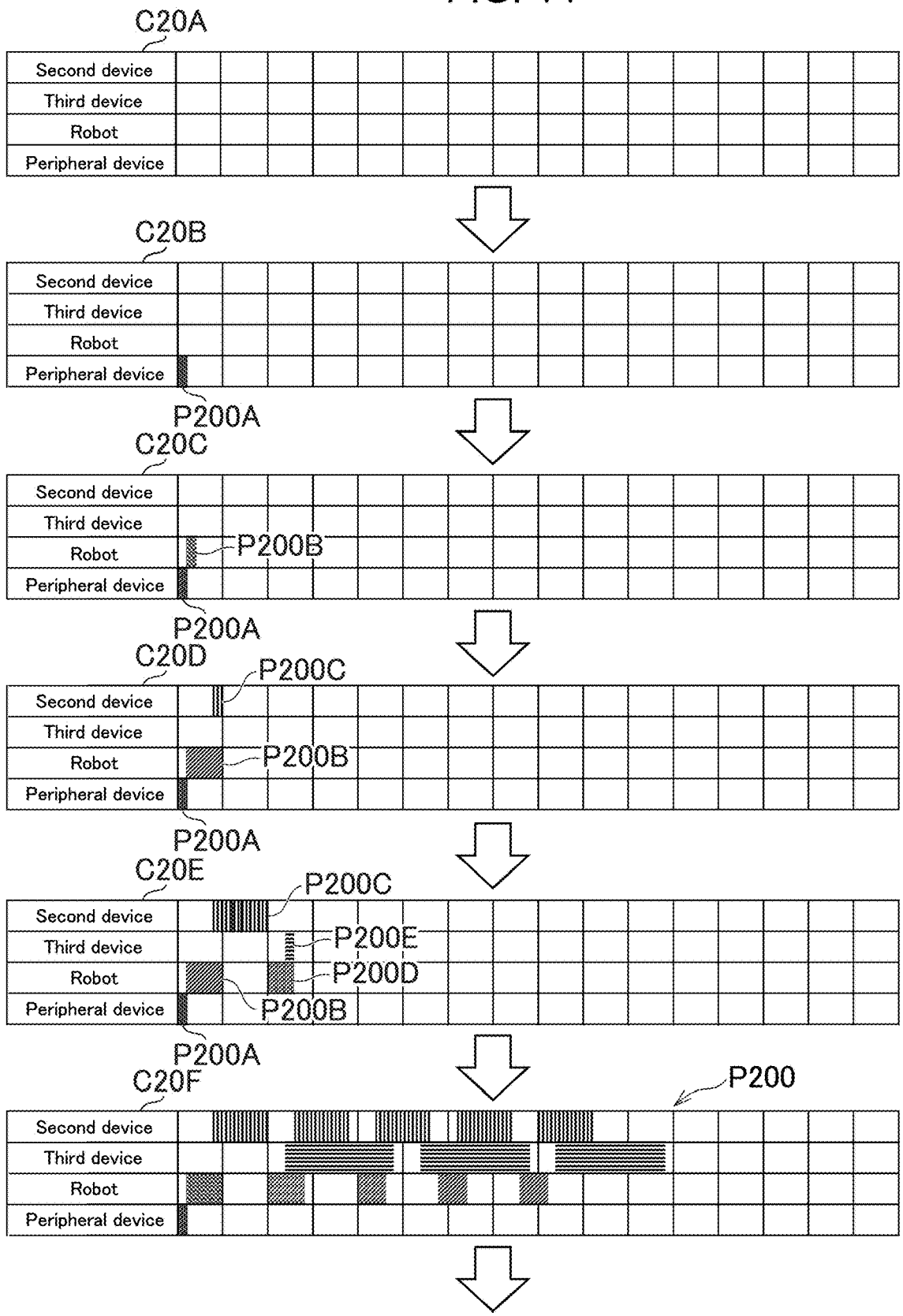
FIG. 14 illustrates an example of how a display of a chart changes on a simulation screen according to an embodiment of the present invention.

FIG. 14 illustrates an example of how a display of the chart (C20) changes on the simulation screen (G2). In FIG. 14, how the chart (C20) changes on a time-series basis is expressed by reference numeral symbols with an alphabet appended at the end of "C20" such as charts (C20A-C20F). When the charts (C20A-20F) are not particularly distinguished, they are each simply referred to as the chart (C20). Similarly, when process images (P200A-P200E) are not distinguished, they are simply referred to as process images (P200).

At a time point when the simulation is started, none of the devices are executing a process. Therefore, as in the chart (C20A), the process images (P200) are not displayed in the chart (C20). When the simulation starts, the setup process by a peripheral device is executed first. Therefore, as in the chart (C20B), in the row for the peripheral device, the process image (P200A) indicating that the setup process is being executed is displayed. A length of a lateral width of the process image (P200A) corresponds to the planned time of the setup process.

For example, when the planned time of the setup process is 10 seconds, the length of the lateral width of the process image (P200A) is a length corresponding to 10 seconds. Since the setup process has a very short planned time compared to other processes such as the second large process, the lateral width is actually shorter than that in the example of FIG. 14. However, in order to improve visibility of the process image (P200A) in the drawing, in FIG. 14, the lateral width of the process image (P200A) is longer than it actually is. Similarly for the other process images (P200), the lateral width of a process image (P200) of a certain process is a length corresponding to the planned time to this process. However, in FIG. 14, in order to improve its visibility in the drawing, the length is adjusted.

When the setup process ends, the first large process with respect to the first object is executed. In the chart (C20), actions of the first device 30 are not displayed. However, the first big process involves not only the first device 30 but also the robot 24. Therefore, as in the chart (C20C), in the row for the robot 24, the process image (P200B) indicating that the first large process is being executed is displayed. Since the planned time for the first large process is 70 seconds, the process image (P200B) has a lateral width of 70 seconds. This time of 70 seconds includes not only the time required for an action of the robot 24 but also the time required for an action of the first device 30. However, in FIG. 14, it is illustrated as the time for the action of the robot 24.

When the first large process with respect to the first object ends, the second large process with respect to the first object is executed. Therefore, as in the chart (C20D), in the row for the second device 40, the process image (P200C) indicating that the second large process is being executed is displayed. When the second large process with respect to the first object ends, the internal setup process and the third large process with respect to the first object are continuously executed. The internal setup process is executed by the robot 24, and the third large process is executed by the third device 50. Therefore, as in the chart (C20E), in the row for the robot 24, the process image (P200D) indicating that the internal setup process is being executed is displayed, and, in the row for the third device 50, the process image (P200E) indicating that the third large process is being executed is displayed.

After that, in the same manner, when the ending process with respect to the first object is executed and the processes with respect to the second and subsequent objects are executed, as in the chart (C20F), the process images (P200) indicating how the processes with respect to the objects are executed on a time-series basis are displayed. In the chart (C20F), since the number of process images (P200) is large, the alphabet appended at the end of "P200" is omitted. The process images (P200) are displayed one after another in the chart (C20) until the simulation is completed.

In the virtual space (V21), objects move corresponding to the display of the process images (P200) in the chart (C20). The animation may be executed such that the robot 24 on the simulation screen (G2) also moves the objects. The list (L22) may be displayed such that a currently executing process changes its color in the list (L22). As described above, in the third embodiment, by executing the simulation, process planning by a user is supported. In the following, details of the third embodiment are described.

Figure 15:
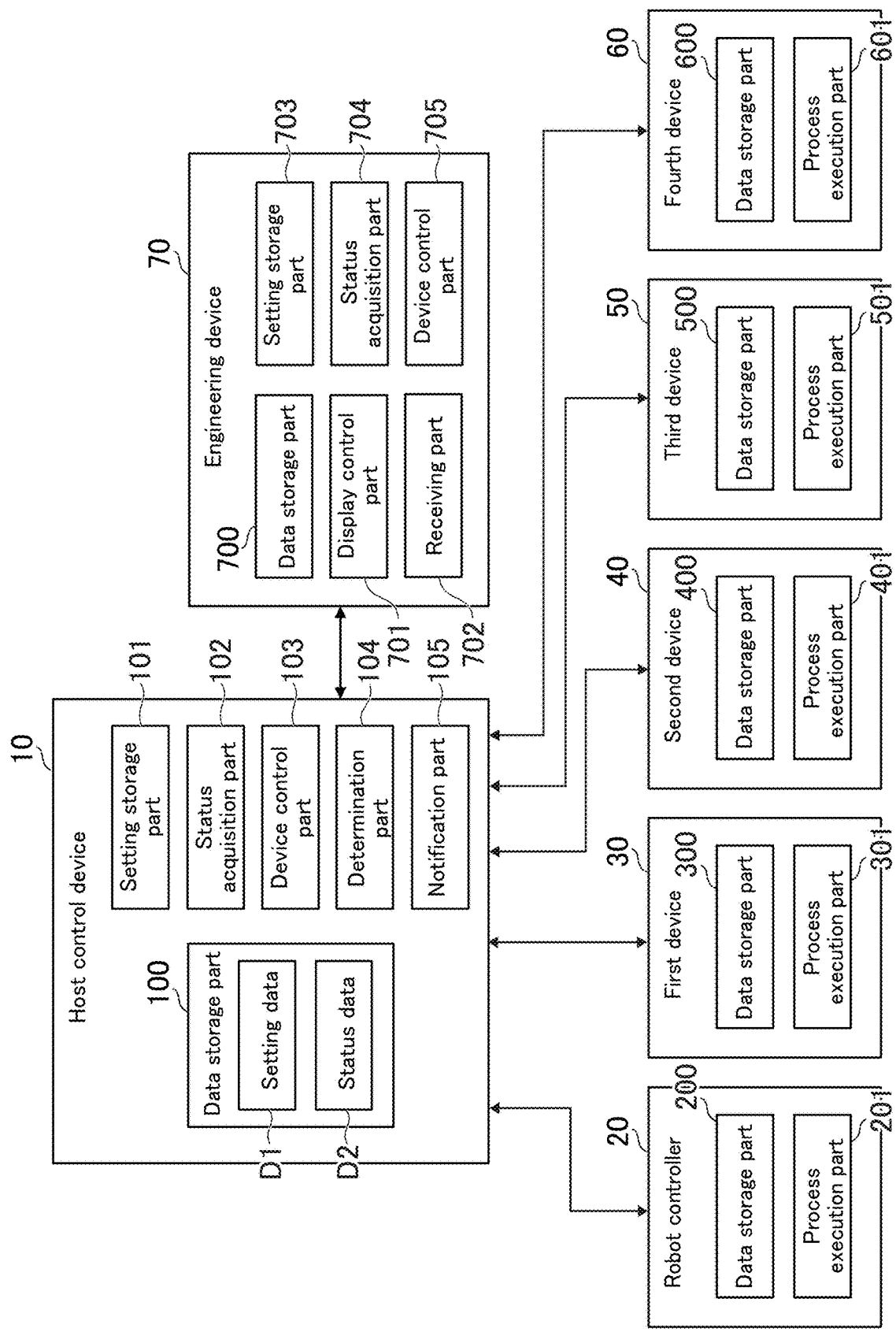
FIG. 15 is a functional block diagram in a third embodiment of the present invention.

FIG. 15 is a functional block diagram of the third embodiment. In the engineering device 70, a setting storage part 703, a status acquisition part 704, and a device control part 705 are realized. These are mainly realized by the CPU 71.

The control system 1 includes a simulator that virtually executes the multiple processes. The data storage part 700 stores the simulator. The data storage part 700 also stores the setting data (D1) and the status data (D2). However, the status data (D2) indicates virtual statuses of the devices on the simulator. The setting data (D1) of the data storage part 700 is the same as the setting data (D1) of the data storage part 100.

The settings in the third embodiment include a layout that indicates an arrangement of the multiple devices. For example, the layout is the arrangement of the devices in the virtual space (V21). The virtual space (V21) may be expressed with a three-dimensional space or a two-dimensional plane. The layout includes names of the devices and coordinates indicating positions of the devices. A user can specify the names and the positions of the devices. The simulator calculates a travel time required for a moving process based on at least the layout.

For example, the simulator calculates a distance between a start point and an end point of an object in a moving process. The start point is a position of the object at the start of the moving process. The start point can be a point of departure of the object in the moving process. The end point is a position of the object at the end of the moving process. The end point can be a destination point of the object in the moving process. The start point and the end point of a moving process are indicated in the control program or in a program for the simulation created by diverting the control program. The simulator calculates a travel time by dividing a distance between coordinates of the start point and coordinates of the end point by a predetermined travel speed. The travel time in a moving process may be a predetermined fixed value instead of being calculated based on the layout.

For example, the settings include an execution time of at least one process. This execution time is the planned time described above. In the data storage example illustrated in FIG. 6, the execution time is indicated in the time information. The simulator executes timer processing corresponding to an execution time as virtual execution of at least one process. As described above, the simulator executes the simulation by replacing the processing indicated by the control program with the timer processing corresponding to the execution time. The timer processing corresponding to the execution time is timer processing in which a time indicated by the timer processing is proportional to the execution time.

For example, the execution time of at least one process is an integer multiple of a predetermined minimum time. The simulator executes timer processing based on a value obtained by multiplying a value, which is obtained by dividing an execution time of at least one process by a minimum time, by a minimum value of a scan time that indicates a processing period of the control program for controlling the multiple devices. The minimum time and the scan time are stored in the data storage part 700. As described above, the simulator executes simulation by replacing the processing of the control program with timer processing that includes a value corresponding to the above calculation.

The data storage part 700 stores an execution result of the simulator. Therefore, the data storage part 700 functions as a result storage part. The data storage part 700 stores an execution result of the simulator for each setting specified by a user. For example, the data storage part 700 stores an estimated time required to complete all the processes as an execution result of the simulator. The data storage part 700 may store a start time when each device starts a process and an end time when the process is ended as execution results of the simulator. The data storage part 700 may store other calculation results by the simulator as execution results of the simulator.

The status acquisition part 704 acquires a status on the simulator. The status acquisition part 704 acquires a calculation result by the simulator while the simulator is executing the simulation. The device control part 705 dynamically determines a process to be executed next in the simulator and controls the simulator based on the settings stored by the setting storage part 703 and the status on the simulator. The processing by the device control part 705 is different from the processing by the device control part 103 of the host control device 10 in terms of processing in simulation, but is otherwise similar to the processing by the device control part 103.

The display control part 701 displays the simulation screen (G2) that shows the execution results of the simulator. For example, when the settings are changed by a user, based on the execution results recorded in the data storage part 700, the display control part 701 may display a result of the simulator corresponding to the settings before the change and a result of the simulator corresponding to the settings after the change on the simulation screen (G2) in a comparable way. Displaying the results "in a comparable way" is not limited to displaying both the results of the simulator before and after the change on a single simulation screen (G2), but also includes using multiple simulation screens (G2) to display both the results of the simulator before and after changes. For example, the display control part 701 may display the simulation results before and after the change in the settings in a comparable way by calculating a time required to complete an entire process before and after the change and displaying both times.

For example, the display control part 701 may display the process images (P200) indicating the start times and the end times of the processes in the simulation on the chart (C20) having the time axis on the simulation screen (G2). A position of a left edge of a process image (P200) in the chart (C20) indicates the start time of the process. A position of a right edge of a process image (P200) indicates the end time of the process. A length of a process image (P200) in the time axis direction is a length from the start time to the end time. The start time and the end time of a process can be expressed using any method, and for example, numerical values of the start time and the end time may be displayed on the simulation screen (G2).

For example, the display control part 701 may display the execution results of the simulator as animations. The display control part 701 may slow down an animation playback speed for at least one of the multiple processes. A process that slows down the animation may be any process, may be specified by a user, or may be automatically selected based on the settings. In the third embodiment, the animation of a process having relatively long time indicated by the time information is slowed down. Here, the animation of the process image (P200) indicating the processing process by the third device 50 is slowed down. It is also possible to slow down only the animation near at least one of the start time and the end time of the process image (P200). In addition, for example, animations in the virtual space (V21) may be slowed down. As a method of slowing down an animation, various commonly known methods may be used. For example, a method for slowing down a playback speed in video playback software may be used.

The control system 1 of the third embodiment dynamically determines a process to be executed next in the simulator and controls the simulator based on the settings specified by the user and the status on the simulator. The control system 1 displays the simulation screen (G2) that shows the execution results of the simulator. As a result, process design is facilitated. The user can view the simulation results on the simulation screen (G2) and revise the settings of the control system 1 when there is any inefficient part.

Further, the simulator calculates a travel time required for a moving process based on at least the layout that indicates the arrangement of multiple devices. As a result, a more accurate travel time can be simulated, and thus, accuracy of the simulation increases. As in the control system 1, when processes are dynamically determined and the robot 24 performs moving processes between the processes, a combination of moving processes has a high degree of freedom, and thus, it is difficult to predict an execution time. In this regard, since a travel time is calculated by the simulator, predictability of an execution time of a moving process is enhanced. More optimal setting adjustment becomes possible.

Further, when the settings are changed by a user, the control system 1 displays a result of the simulator corresponding to the settings before the change and a result of the simulator corresponding to the settings after the change on the simulation screen in a comparable way. This makes it easier to compare the simulation results before and after the change in the settings, and to easily understand whether or not the change in the settings is effective.

Further, the control system 1 displays the process images (P200) indicating the start times and the end times of the processes in the simulation on the chart (C20) having the time axis on the simulation screen (G2). This makes it easier to visually grasp the start times and the end times of the processes in the simulation on the chart (C20), and facilitates process design.

Further, the simulator executes timer processing corresponding to an execution time as virtual execution of at least one process. This allows the user to avoid creating a simulation application.

Further, the simulator executes timer processing based on a value obtained by multiplying a value, which is obtained by dividing an execution time of at least one process by a minimum time, by a minimum value of a scan time that indicates a processing period of the control program for controlling the multiple devices. This allows the simulation to be quickly completed. User convenience is enhanced.

Further, the control system 1 slows down an animation playback speed for at least one of the multiple processes. As a result, the animation playback speed is reduced at a specific part, allowing a user to carefully review a simulation result at a part the user is interested in.

Fourth Embodiment

In a fourth embodiment, a structure that solves Problem 3 (an end time is not considered) is described. In the fourth embodiment, description about structural components that are the same as those in the first-third embodiments is omitted.

Figure 16:
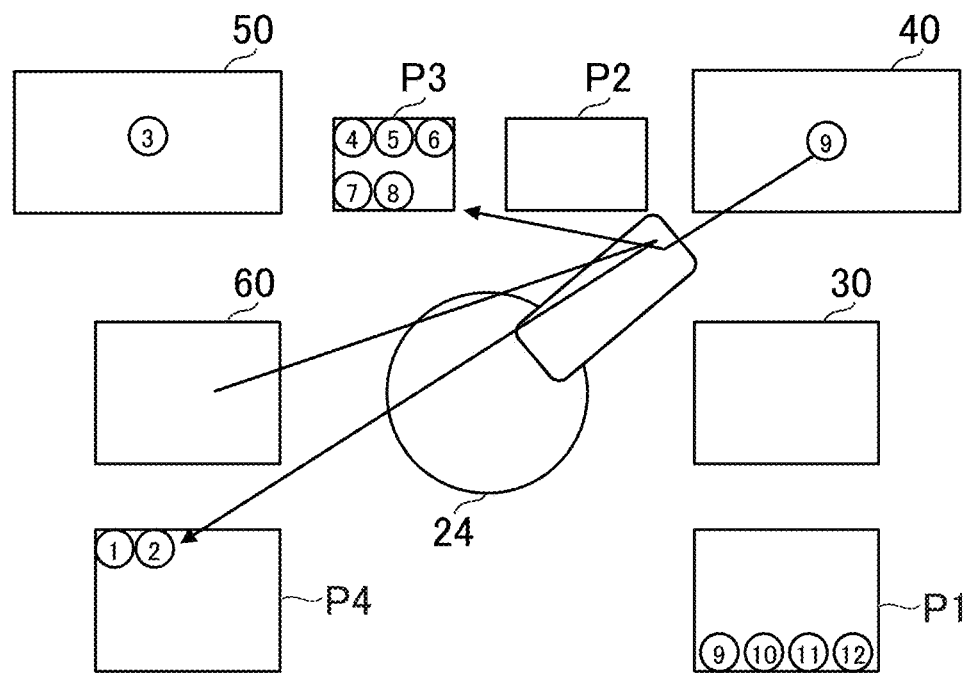
FIG. 16 is an explanatory diagram of Problem 3 (an end time is not considered)

FIG. 16 is an explanatory diagram of Problem 3 (an end time is not considered). In the fourth embodiment, a case where the operation efficiency of the third device 50 is increased is described as an example. In the example of FIG. 16, the processing process by the third device 50 with respect to the third object is being executed. Further, the cleaning process by the fourth device 60 with respect to the second object and the processing process by the second device 40 with respect to the ninth object have been completed.

In this case, in order to cause the third device 50 to fully operate, it is better to execute a moving process in which the third object is taken out from the third device 50 immediately after the processing process by the third device 50 with respect to this object is completed. However, when the end time of the processing process by the third device 50 is not considered, there is a possibility that another process is executed just before the processing process by the third device 50 is completed and the third object cannot be immediately taken out. In addition, for example, when the second object with respect to which the cleaning process has been completed is still arranged in the fourth device 60, the third object cannot be immediately taken out. In this case, the Complete state of the third device 50 continues for a while, and thus, the operating efficiency of the third device 50 decreases accordingly.

Therefore, by considering the end time of the third device 50, upon completion of the processing process by the third device 50 with respect to a certain object, the host control device 10 of the fourth embodiment immediately executes a moving process in which the object is taken out from the third device 50. As a result, the third device 50 is caused to fully operate and Problem 3 is solved, and thus, the operation efficiency of the control system 1 increases. In the following, details of the control system 1 of the fourth embodiment are described.

Figure 17:
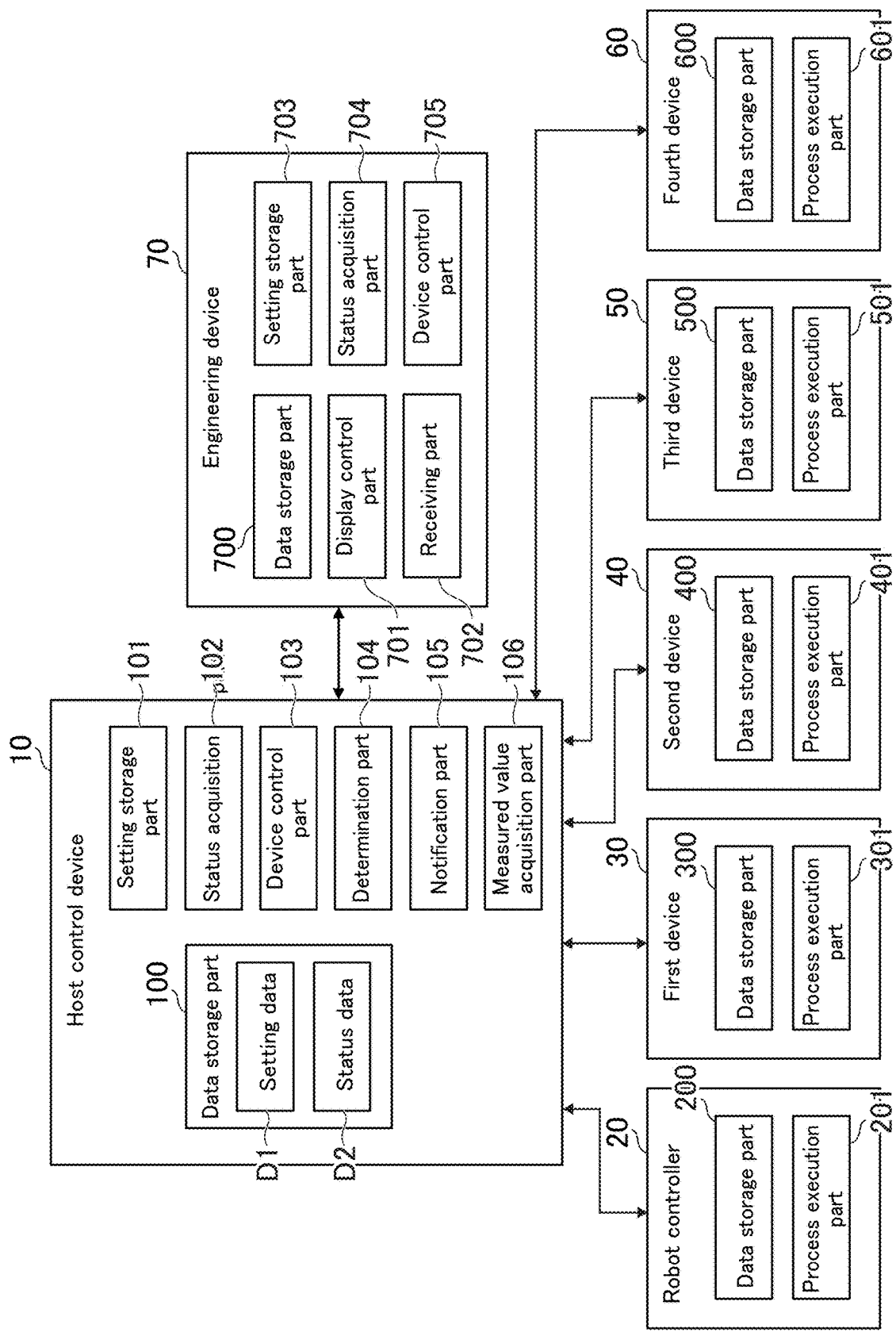
FIG. 17 is a functional block diagram of a fourth embodiment of the present invention.

FIG. 17 is a functional block diagram of the fourth embodiment. In the host control device 10, a measured value acquisition part 106 is realized. The measured value acquisition part 106 is mainly realized by the CPU 11. In the fourth embodiment, a setting stored by the setting storage part 101 is an execution time required to execute the third large process, which is at least one of the multiple processes. This execution time is a time required for processing by the third device 50 in the third large process. For example, since the setting data (D1) includes the time information, the setting storage part 101 stores the time information included in the setting data (D1) as a setting.

In the fourth embodiment, the status acquired by the status acquisition part 102 is the start time at which execution of the third large process, which is at least one process, is started in the control system 1. For example, when the status data (D2) includes the start times of the individual processes, the status acquisition part 102 acquires the start time of the processing process by the third device 50 in the third large process included in the status data (D2). A start time does not have to be included in the status data (D2), and a time when the processing process by the third device 50 in the third large process with respect to a certain object is started may be recorded in the data storage part 100.

The device control part 103 determines a process to be executed next based on the execution time acquired by the setting storage part 101 and the start time acquired by the status acquisition part 102. For example, on condition that a difference between the current time and the start time in the control system 1 is equal to or larger than the execution time acquired by the setting storage part 101, the device control part 103 makes it possible to take out an object from the third device 50 in the ending process, in which an object with respect to which the processing process by the third device 50 in the third large process has been completed is taken out from a predetermined place. Such an execution condition is defined in the setting data (D1). The above difference is an elapsed time from the start of the processing process by the third device 50 in the third large process. Instead of the above difference, it is also possible that a time expected for the processing process by the third device 50 in the third large process to complete is counted down.

A method of determining a process to be executed next based on the execution time acquired by the setting storage part 101 and the start time acquired by the status acquisition part 102 is not limited to the above example. For example, when the difference between the current time and the start time in the control system 1 approaches the execution time acquired by the setting storage part 101, the device control part 103 may make executable a moving process in which an object is taken out from the third device 50. When the above difference is less than a threshold, the device control part 103 may make executable a process other than a moving process in which an object is taken out from the third device 50. This process may be any process.

The measured value acquisition part 106 acquires a measured value of a time required for the third large process, which is at least one process. The third device 50 measures a time required from the start to the end of this process and transmits the time to the host control device 10. It is also possible that the measurement of the time is executed on the host control device 10 side. For example, the host control device 10 may measure a time from when it instructs the third device 50 to execute a process to when it receives completion of the execution of the process from the third device 50.

When a measured value is acquired, the device control part 103 determines a process to be executed next based on the measured value instead of the execution time specified by the user. When a measured value is acquired, the device control part 103 determines a process to be executed next based on the measured value rather than the execution time specified by the user. That is, the device control part 103 determines a process to be executed next based on the measured value instead of a time that is a predicted value. A method for determining a process is as described in the third embodiment, and description of the time information, which is a predicted value, may be replaced with the measured value.

In the fourth embodiment, since at least one process is a process executed with respect to an object attached to a predetermined place, on condition that the difference between the current time and the start time in the control system 1 is equal to or larger than the execution time, the device control part 103 makes executable a moving process in which an object with respect to which at least one process has been completed is taken out from a predetermined place. As described above, this moving process is a process in which an object is moved from the third device 50. However, it may be another moving process. For example, when the processing process by the second device 40 is preferentially executed, the device control part 103 may make executable a process in which an object is moved from the second device 40 under the above condition.

The control system 1 of the fourth embodiment determines a process to be executed next based on the execution time required to execute at least one of the multiple processes and the start time at which the execution of the at least one process is started. As a result, by considering the time when the processing process by the third device 50 ends, the operation efficiency of the control system 1 further increases. An object with respect to which the processing process by the third device 50 has been completed can be immediately taken out, and the processing process by the third device 50 with respect to the next object can be started.

Further, when a measured value of a time required for at least one process is acquired, the control system 1 determines a process to be executed next based on the measured value instead of the execution time specified by the user. As a result, when a measured value of a time required for the processing by the third device 50 in the second large process is acquired, by determining a process to be executed next based on the measured value rather than the execution time specified by the user, control is performed in line with an actual status of the control system 1, and the operation efficiency of the control system 1 is further improved.

Further, the control system 1 makes executable a moving process in which an object with respect to which at least one process has been completed is taken out from a predetermined place on condition that the difference between the current time and the start time is equal to or larger than the execution time. As a result, an object with respect to which at least one process has been completed can be immediately taken out. Therefore, the operation efficiency of the control system 1 is further improved.

Fifth Embodiment

For example, the control system 1 may need to execute various internal setup processes. As an example of an internal setup process, a process in which a hand is replaced is described. Before the processing by the second device 40, after the processing by the second device 40, and after the processing by the third device 50, hands used by the robot 24 may be different. In the following, a process in which a hand is replaced is described as a setup process. A setup process is a kind of internal setup process. Therefore, in a fifth embodiment, a timing for the robot 24 to replace a hand is optimized and the operation efficiency of the control system 1 is increased. In the fifth embodiment, description about structural components that are the same as those in the first-fourth embodiments is omitted.

FIG. 18 illustrates an example of a process to be executed when hand replacement is considered. In the fifth embodiment, a case is described where there are three types of hands: a first hand (H1) for holding an object before the processing by the second device 40, a second hand (H2) for holding an object after the processing by the second device 40, and a third hand (H3) for holding an object after the processing by the third device 50. In the example of FIG. 18, although a case is described where details of individual processes differ from the first-fourth embodiments, a general flow is the same as the first-fourth embodiments.

In the fifth embodiment, the multiple processes include a setup process related to a moving process. For example, processes in which the robot 24 wears a hand are a first setup process, a second setup process, and a third setup process in FIG. 18. For example, the first setup process includes a process in which the robot 24 moves to the second storage place (P2), a process in which the robot 24 removes an attached hand, a process in which the robot 24 wears the first hand (H1), and a process in which the robot 24 moves to a standby position. The second setup process includes a process in which the robot 24 moves to the second storage place (P2), a process in which the robot 24 removes an attached hand, a process in which the robot 24 wears the second hand (H2), and a process in which the robot 24 moves to a standby position.

The third setup process includes a process in which the robot 24 moves to the second storage place (P2), a process in which the robot 24 removes an attached hand, a process in which the robot 24 wears the third hand (H3), and a process in which the robot 24 moves to a standby position. By executing the processes in a way as illustrated in FIG. 18, the robot 24 can efficiently wear a hand required for the next process. Such attaching of a hand can be made more efficient by processing described below.

In the fifth embodiment, at least one device includes a robot 24 capable of wearing multiple types of hands. A hand is an example of an end effector. Therefore, a part described as a hand can be read as an end effector. An end effector is a member attached to a tip of the robot 24. An end effector may be a member called a claw. An end effector is a member for moving an object by grasping, adsorbing, adhering, or hooking the object.

In the fifth embodiment, based on the settings and the status and according to an executing status of a process with respect to an object, the device control part 103 determines a setup process as a process to be executed next before a moving process with respect to the object.

For example, the device control part 103 identifies a hand required for a process to be executed next from among multiple types of end effectors, and attaches the identified hand to the robot 24. Information indicating which hand is required for which process is included in the setting data (D1). Further, information indicating a place where a hand is arranged is included in the setting data (D1). When a process to be executed next is determined, the device control part 103 refers to the setting data (D1) and identifies a required hand. As control for attaching a hand to the robot 24, commonly known control may be used.

For example, the device control part 103 may identify a hand that has already been attached to the robot 24, and, when a hand required for a process to be executed next has already been attached to the robot 24, may skip a process of attaching this hand to the robot. Information identifying a hand attached to the robot 24 is included in the status data (D2). When a process to be executed next is determined, the device control part 103 may refer to the setting data (D1) and the status data (D2) to determine whether or not a hand required in the next process has been attached. Skipping a process means executing a next process without executing that process.

For example, the device control part 103 may attach to the robot a hand required for a process to be executed next based on times required for processes related to multiple types of hands. For example, when the time required for the processing by the third device 50 is longer than the time required for the processing by the second device 40 and the third device 50 is to be prioritized, the device control part 103 attaches the third hand (H3) to the robot 24 on condition that the processing process by the second device 40 in the second large process is being executed and the processing process by the third device 50 in the third large process is being executed.

For example, the second hand (H2) is attached to the robot 24 on condition that the processing process by the second device 40 in the second large process is being executed and the processing process by the third device 50 in the third large process is not being executed. For example, the third hand (H3) is attached to the robot 24 on condition that the processing process by the second device 40 in the second large process is not being executed and the processing process by the third device 50 in the third large process is being executed. When the time information is taken into account in these conditions, the attaching of the hands can be made more efficient.

According to the control system 1 of the fifth embodiment, a setup process is determined as a process to be executed next before a moving process of an object according to an execution status of a process with respect to the object. As a result, the next process can be reliably executed, and the operation efficiency of the control system 1 further increases. Further, in the control system 1, when a hand required for the next process has already been attached to the robot 24, a process of attaching the hand to the robot 24 can be skipped. Thereby, execution of an unnecessary process is avoided, and the operation efficiency of the control system 1 further increases. Further, in the control system 1, based on the times required for the processes related to the multiple types of hands, a hand required for a process to be executed next is attached to the robot. Thereby, the operation efficiency of the control system 1 further increases. Also for a case where a setup process other than attaching of a hand is executed, similarly, the operation efficiency of the control system 1 increases.

Modified Embodiments

The present invention is not limited to the embodiments described above. Appropriate modifications are possible within a scope without departing from the spirit of the present invention.

For example, Problem 4 (multiple processes cannot be executed at the same time) may be solved by determining a process to be executed next so that a combination of multiple processes specified by a user is consecutively executed. For example, taking out an object from the second device 40 in the internal setup process with respect to the third object and attaching an object to the second device 40 in the second large process with respect to the fourth object can be continuously executed. Therefore, Problem 4 (multiple processes cannot be executed at the same time) can be solved.

In this case, on condition that a pre-process of attaching an object to the second device 40 in the second large process has been completed and the processing process by the second device 40 in the second large process has not been completed, the control system 1 makes it possible to attach an object to the second device 40 in the second large process. On condition that a pre-process of attaching an object to the second device 40 in the second large process has been completed and the processing process by the second device 40 in the second large process has been completed, the control system 1 makes it possible to continuously execute attaching an object to the second device 40 in the second large process and taking out an object from the second device 40 in the internal setup process.

For example, in the first-fifth embodiments, a case is described where the second device 40 performs a first half of processing and the third device 50 performs a second half of processing with respect to a certain object. The control system 1 is applicable to any other case. For example, it is also possible that operation efficiency of a control system 1 including multiple controlled devices executing the same multiple processes is improved. For example, it is also possible that operation efficiency of a control system 1 including multiple devices executing mutually different processes with respect to mutually different types of objects is improved.

For example, the functions described above may each be realized by any device in the control system 1. For example, the robot controller corresponds to a control device, and the functions described as being included in the host control device 10 may be realized by the robot controller. For example, the functions described as being included in the host control device 10 may be shared by multiple devices.

Japanese Patent Application Laid-Open Publication No. 2012-194678 describes a technology in which a program is created by describing an operation of a PLC (Programmable Logic Controller), which controls multiple devices in a system in which multiple processes are executed in turn with respect to each of multiple objects, in a ladder chart, and the PLC controls one or more devices based on the created program.

One of problems to be solved by the present invention is, for example, to increase operation efficiency of a control system.

A control system according to one aspect of the present invention includes multiple devices that each independently executes at least one of multiple processes with respect to multiple objects with respect to each of which the multiple processes are to be executed. The control system includes: a setting storage part that stores a setting specified by a user about an execution condition of at least one of the multiple processes; a status acquisition part that acquires a current status of the control system; and a device control part that dynamically determines a process to be executed next among the multiple processes based on the setting and the status, and controls the multiple devices.

According to an embodiment of the present invention, for example, the operation efficiency of the control system increases.

Obviously, numerous modifications and variations of the present invention are possible in light of the above teachings. It is therefore to be understood that within the scope of the appended claims, the invention may be practiced otherwise than as specifically described herein.

The invention claimed is:

1. A control system, comprising:
a plurality of devices configured to each independently execute at least one of multiple processes with respect to multiple objects;
a memory that stores a setting specified by a user about an execution condition of at least one of the multiple processes;
a buffer where the multiple objects are waiting for execution of at least one subsequent process among the multiple processes; and
processing circuitry configured to acquire a current status of the control system, dynamically determine a process to be executed next among the multiple processes based on the setting and the status, and control the plurality of devices,
wherein the plurality of devices includes at least one robot that executes a moving process in which the multiple objects are moved between the devices, the processing circuitry is configured to determine, based on the setting and the status, the moving process by the robot as a process to be executed next such that when one process by one of the devices is completed, another one of the processes by another one of the devices is executed and that when a preceding process before the subsequent process is completed, the one of the objects is moved to the buffer, and when the subsequent process is executed, the one of the objects is moved from the buffer, the setting includes a maximum number of the multiple objects that can be placed in the buffer, the status includes a current number of the multiple objects placed in the buffer in the control system, and the processing circuitry is configured to not determine the preceding process as the process to be executed next when the current number reaches the maximum number, and determine the preceding process as the process to be executed next when the current number does not reach the maximum number.

2. The control system according to claim 1, wherein the setting includes an execution order of two or more processes with respect to one of the multiple objects, the moving process is between the two or more processes, and the processing circuitry is configured to determine, based on the setting, the moving process by the robot as the process to be executed next such that the two or more processes are executed in the execution order with respect to the one of the multiple objects.

3. The control system according to claim 1, wherein the setting is a priority according to an execution time of a process, the status is an execution status of a priority process having a relatively high priority among the multiple processes, and when the priority process with respect to one object of the multiple objects is completed, the processing circuitry is configured to determine the moving process related to the priority process as the process to be executed next such that the one object is moved from a device that executes the priority process and another object is moved to the device.

4. The control system according to claim 3, wherein when the priority process is completed, the processing circuitry is configured to preferentially determine, as the process to be executed next, the moving process related to the priority process over the moving process related to a process having a relatively low priority.

5. The control system according to claim 1, wherein the processing circuitry is configured to control a simulator to virtually execute the multiple processes, display a simulation screen showing an execution result of the simulator, acquire the status on the simulator, and based on the setting and the status on the simulator, dynamically determine the process to be executed next in the simulator and control the simulator.

6. The control system according to claim 5, wherein the setting includes a layout indicating a positioning of the multiple devices, and the processing circuitry is configured to control the simulator to calculate a travel time required for the moving process based on at least the layout.

7. The control system according to claim 5, further comprising:
a result storage memory that stores the execution result of the simulator,
wherein when the setting is changed by the user, based on the execution result recorded in the result storage memory, the processing circuitry is configured to display a result of the simulator corresponding to the setting before the change and a result of the simulator corresponding to the setting after the change on the simulation screen in a comparable way.

8. The control system according to claim 5, wherein the processing circuitry is configured to display a process image indicating a start time and an end time of each process in simulation on a chart having a time axis on the simulation screen.

9. A control system, comprising:
a plurality of devices configured to each independently execute at least one of multiple processes with respect to multiple objects;
a memory that stores a setting specified by a user about an execution condition of at least one of the multiple processes; and
processing circuitry configured to acquire a current status of the control system, dynamically determine a process to be executed next among the multiple processes based on the setting and the status, and control the plurality of devices,
wherein the plurality of devices includes at least one robot that executes a moving process in which the multiple objects are moved between the devices, the processing circuitry is configured to determine, based on the setting and the status, the moving process by the robot as a process to be executed next such that when one process by one of the devices is completed, another one of the processes by another one of the devices is executed, the setting includes a priority according to an execution time of a process, the status includes an execution status of a priority process having a relatively high priority among the multiple processes, when the priority process with respect to one object of the multiple objects is completed, the processing circuitry is configured to determine the moving process related to the priority process as the process to be executed next such that the one object is moved from a device that executes the priority process and another object is moved to the device, and the processing circuitry is configured to determine whether an execution time of the priority process is equal to or larger than a threshold, and generate a notification when it is determined that the execution time is equal to or larger than the threshold.

10. The control system according to claim 9, further comprising:
a buffer where the multiple objects are waiting for execution of at least one subsequent process among the multiple processes,
wherein the processing circuitry is configured to determine, based on the setting and the status, the moving process by the robot as the process to be executed next such that when a preceding process before the subsequent process is completed, the one of the objects is moved to the buffer, and when the subsequent process is executed, the one of the objects is moved from the buffer.

11. The control system according to claim 9, wherein the processing circuitry is configured to control a simulator to virtually execute the multiple processes, display a simulation screen showing an execution result of the simulator, acquire the status on the simulator, and based on the setting and the status on the simulator, dynamically determine the process to be executed next in the simulator and control the simulator.

12. The control system according to claim 11, wherein the setting includes a layout indicating a positioning of the multiple devices, and the processing circuitry is configured to control the simulator to calculate a travel time required for the moving process based on at least the layout.

13. The control system according to claim 11, further comprising:
a result storage memory that stores the execution result of the simulator,
wherein when the setting is changed by the user, based on the execution result recorded in the result storage memory, the processing circuitry is configured to display a result of the simulator corresponding to the setting before the change and a result of the simulator corresponding to the setting after the change on the simulation screen in a comparable way.

14. The control system according to claim 11, wherein the processing circuitry is configured to display a process image indicating a start time and an end time of each process in simulation on a chart having a time axis on the simulation screen.

15. A control system, comprising:
a plurality of devices configured to each independently execute at least one of multiple processes with respect to multiple objects;
a memory that stores a setting specified by a user about an execution condition of at least one of the multiple processes; and
processing circuitry configured to acquire a current status of the control system, dynamically determine a process to be executed next among the multiple processes based on the setting and the status, and control the plurality of devices,
wherein the plurality of devices includes at least one robot that executes a moving process in which the multiple objects are moved between the devices, the processing circuitry is configured to determine, based on the setting and the status, the moving process by the robot as a process to be executed next such that when one process by one of the devices is completed, another one of the processes by another one of the devices is executed, the processing circuitry is configured to control a simulator to virtually execute the multiple processes, display a simulation screen showing an execution result of the simulator, acquire the status on the simulator, and based on the setting and the status on the simulator, dynamically determine the process to be executed next in the simulator and control the simulator, the setting includes an execution time of at least one process of the multiple processes, and the processing circuitry is configured to control the simulator to execute timer processing corresponding to the execution time as virtual execution of the at least one process.

16. The control system according to claim 15, wherein the execution time of the at least one process is an integer multiple of a predetermined minimum time, and the processing circuitry is configured to control the simulator to execute the timer processing based on a value obtained by multiplying a value, which is obtained by dividing the execution time of the at least one process by the predetermined minimum time, by a minimum value of a scan time that indicates a processing period of a control program for controlling the plurality of devices.

17. The control system according to claim 15, wherein the setting includes an execution time required to execute at least one process of the multiple processes, the status includes a start time at which execution of the at least one process is started in the control system, and the processing circuitry is configured to determine the process to be executed next based on the execution time and the start time.

18. The control system according to claim 17, wherein the processing circuitry is configured to acquire a measured value of a time required for the at least one process, and when the measured value is acquired, determine the process to be executed next based on the measured value instead of the execution time specified by the user.

19. The control system according to claim 17, wherein the at least one process is a process executed with respect to an object attached to a predetermined place, and the processing circuitry is configured to make executable the moving process in which the object with respect to which the at least one process is completed is taken out from the predetermined place, when that a difference between a current time in the control system and the start time is equal to or larger than the execution time.

20. The control system according to claim 19, wherein the multiple processes include a setup process related to the moving process, and based on the setting and the status and according to an executing status of a process with respect to the object, the processing circuitry is configured to determine the setup process as the process to be executed next before the moving process with respect to the object.

* * * * *